US012587900B2

(12) United States Patent
Awoniyi-Oteri et al.

(10) Patent No.: US 12,587,900 B2
(45) Date of Patent: Mar. 24, 2026

(54) ERROR HANDLING IN DUAL ACTIVE LINK HANDOVER

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Yan Zhou, San Diego, CA (US); Wooseok Nam, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 17/862,130

(22) Filed: Jul. 11, 2022

(65) Prior Publication Data

US 2022/0345959 A1      Oct. 27, 2022

Related U.S. Application Data

(62) Division of application No. 17/012,911, filed on Sep. 4, 2020, now Pat. No. 11,419,019.
(Continued)

(51) Int. Cl.
H04W 76/20      (2018.01)
H04B 7/06      (2006.01)
(Continued)

(52) U.S. Cl.
CPC ........ H04W 28/04 (2013.01); H04B 7/06952 (2023.05); H04L 1/08 (2013.01);
(Continued)

(58) Field of Classification Search
CPC ............. H04W 28/04; H04W 36/0033; H04W 36/0069; H04W 36/00695; H04W 36/08; H04W 36/30; H04W 36/185; H04W 92/12
(Continued)

(56) References Cited

U.S. PATENT DOCUMENTS 10,244,444  B2      3/2019   Ozturk et al.
10,327,265  B2      6/2019   Ly et al.
(Continued)

FOREIGN PATENT DOCUMENTS

CN      105704829  A      6/2016
CN      106304372  A      1/2017
(Continued)

OTHER PUBLICATIONS

R2-1906204, Repetition of RRC messages at handover, 3GPP (Year: 2019).*
(Continued)

*Primary Examiner* — Harun Chowdhury
(74) *Attorney, Agent, or Firm* — Holland & Hart LLP

(57)      ABSTRACT

Methods, systems, and devices for wireless communications are described. In some systems, a user equipment (UE) may perform a dual active link handover procedure from a source base station to a target base station. During the dual active link handover procedure, the UE may have connections to both of the base stations concurrently. In such cases, transmission opportunities for communicating with the base stations may conflict. To handle conflicting transmission opportunities, the UE may drop a monitoring occasion or a packet reception for a base station based on prioritization rules. In some cases, to mitigate packet losses, the base station may configure re-transmissions or slot aggregation to provide the UE with additional opportunities to receive a
(Continued)

packet. Additionally or alternatively, the UE may transmit a notification message to a base station indicating dropped monitoring occasions or packets.

30 Claims, 16 Drawing Sheets

Related U.S. Application Data

(60) Provisional application No. 62/899,114, filed on Sep. 11, 2019.

(51) Int. Cl.

| | |
|---|---|
| *H04L 1/08* | (2006.01) |
| *H04L 41/0803* | (2022.01) |
| *H04L 69/28* | (2022.01) |
| *H04W 28/04* | (2009.01) |
| *H04W 28/06* | (2009.01) |
| *H04W 36/08* | (2009.01) |
| *H04W 36/30* | (2009.01) |
| *H04W 36/00* | (2009.01) |
| *H04W 88/06* | (2009.01) |

(52) U.S. Cl.
CPC .......... *H04L 41/0803* (2013.01); *H04L 69/28* (2013.01); *H04W 28/06* (2013.01); *H04W 36/083* (2023.05); *H04W 36/085* (2023.05); *H04W 36/304* (2023.05); *H04W 76/20* (2018.02); *H04W 36/00692* (2023.05); *H04W 88/06* (2013.01)

(58) Field of Classification Search
USPC ................................. 370/252, 329, 331, 335
See application file for complete search history.

(56) References Cited

U.S. PATENT DOCUMENTS

| | | | | |
|---|---|---|---|---|
| 2004/0088641 | A1 | 5/2004 | Torsner et al. | |
| 2008/0051086 | A2 | 2/2008 | Etemad et al. | |
| 2008/0182581 | A1* | 7/2008 | Ishikawa ............. | H04W 36/185 |
| | | | | 455/442 |
| 2012/0021744 | A1* | 1/2012 | Chin ..................... | H04W 36/08 |
| | | | | 455/436 |
| 2015/0056931 | A1 | 2/2015 | Yerramalli et al. | |
| 2018/0103458 | A1 | 4/2018 | Tooher et al. | |
| 2020/0389897 | A1 | 12/2020 | Mondal et al. | |
| 2021/0076269 | A1 | 3/2021 | Awoniyi-Oteri et al. | |
| 2021/0345205 | A1* | 11/2021 | Persson ............. | H04W 74/0833 |

FOREIGN PATENT DOCUMENTS

| | | | |
|---|---|---|---|
| CN | 107660348 | A | 2/2018 |
| KR | 20080106705 | A * | 12/2008 |
| WO | 2015027161 | | 2/2015 |
| WO | WO-2016140757 | | 9/2016 |
| WO | WO-2018084995 | A1 | 5/2018 |
| WO | WO2018228487 | A1 | 12/2018 |
| WO | 2019134215 | A1 | 7/2019 |
| WO | WO2021008673 | A1 | 1/2021 |

OTHER PUBLICATIONS

KR20080106705_Machine Translation (Year: 2008).*
Intel Corporation: "Summary of Discussions on Physical Layer Aspects of Enhanced Mobility", 3GPP Draft, 3GPP TSG RAN WG1 Meeting #98, R1-1909702 Offline NR Mobility ENH, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Sep. 3, 2019 (Sep. 3, 2019), XP051766296, 11 Pages, Retrieved from the Internet: URL: http://www.3gpp.org/ftp/tsg_ran/WG1_RL1/TSGR1_98/Docs/R1-1909702.zip, [retrieved on Sep. 3, 2019], Section 2.1.
International Preliminary Report on Patentability—PCT/US2020/049665, The International Bureau of WIPO—Geneva, Switzerland, Mar. 24, 2022.
International Search Report and Written Opinion—PCT/US2020/049665—ISAEPO—Dec. 27, 2020.
Mediatek Inc, et al., "Support Dual Active Protocol Stacks to Minimize HO Interruption", 3GPP Draft, 3GPP TSG RAN WG2 Meeting #106, R2-1905892, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 13, 2019 (May 13, 2019), XP051729385, 10 Pages, Retrieved from the Internet: URL: http://www.3gpp.org/ftp/Meetings%5F3GPP%5FSYNC/RAN2/Docs/R2%2D1905892%2Ezip, [retrieved on May 13, 2019], p. 2, line 7-p. 4, line 9.
Qualcomm Incorporated: "On NR Mobility Enhancements", 3GPP Draft, 3GPP TSG-RAN WG1 Meeting #98b, R1-1911136 On NR Mobility Enhancements, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808859, 8 Pages, Retrieved from the Internet: URL: https://ftp.3gpp.org/tsg_ran/WG1_RL1/TSGR1_98b/Docs/R1-1911136.zip R1-1911136 On NR mobility enhancements.docx, [retrieved on Oct. 5, 2019], Section 2, section 2.2.1 and 2.2.2.
Taiwan Search Report—TW109130657—TIPO—May 2, 2024.
Huawei, et al., "Discussion on DRX for NR-U", 3GPP TSG-RAN WG2 Meeting 105bis, R2-1904115, Mar. 29, 2019, Xi'an, China, Apr. 8-12, 2019, 6 Pages.
Huawei, et al., "Physical Layer Aspects for NR Mobility Enhancements", 3GPP TSG RAN WG1 Meeting #98, R1-1908075, Prague, Czech Republic, Aug. 26-30, 2019, Aug. 17, 2019, 11 Pages.
Qualcomm Incorporated, et al., "UL TDM Aspects of Enhanced MBB HO Using Dual Active Protocol Stack", 3GPP TSG-RAN WG2 Meeting #107, R2-1909848, Prague, Czech Republic, Aug. 26, 2019-Aug. 30, 2019, Aug. 16, 2019, 8 Pages.
Samsung: "Enhancements on Multi-TRP/Panel Transmission", 3GPP TSG RAN WG1 Ad-Hoc Meeting 1901, R1-1901076, Jan. 11, 2019, Taipei, Taiwan, Jan. 21-25, 2019, 6 Pages.
European Search Report—EP24215663—Search Authority—Munich—Feb. 26, 2025.

* cited by examiner 910                915                920

905

900

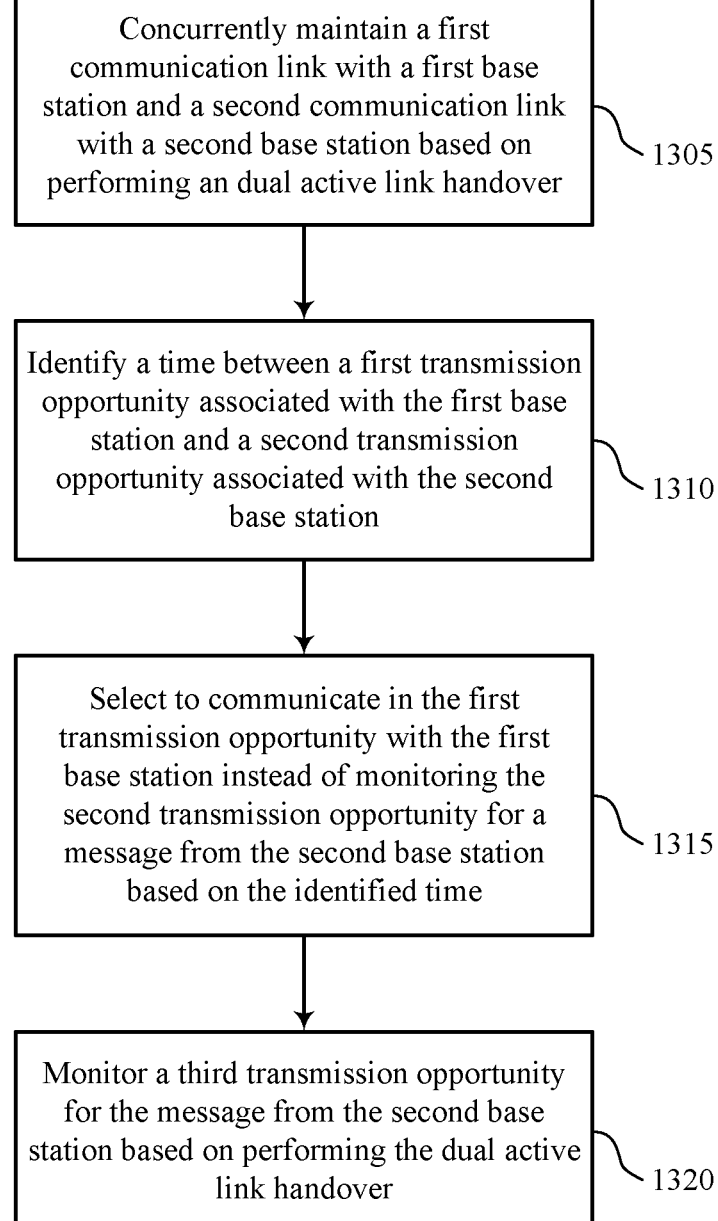

Concurrently maintain a first
communication link with a first base
station and a second communication link
with a second base station based on
performing an dual active link handover

1305

Identify a time between a first transmission
opportunity associated with the first base
station and a second transmission
opportunity associated with the second
base station

1310

Select to communicate in the first
transmission opportunity with the first
base station instead of monitoring the
second transmission opportunity for a
message from the second base station
based on the identified time

1315

Monitor a third transmission opportunity
for the message from the second base
station based on performing the dual active
link handover

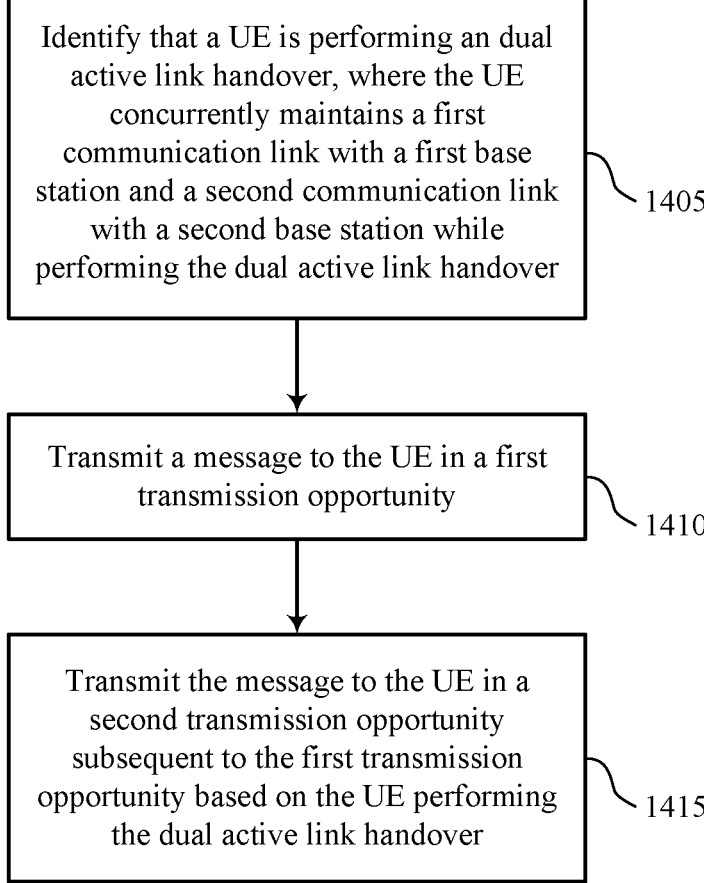

Identify that a UE is performing an dual active link handover, where the UE concurrently maintains a first communication link with a first base station and a second communication link with a second base station while performing the dual active link handover

1405

Transmit a message to the UE in a first transmission opportunity

1410

Transmit the message to the UE in a second transmission opportunity subsequent to the first transmission opportunity based on the UE performing the dual active link handover

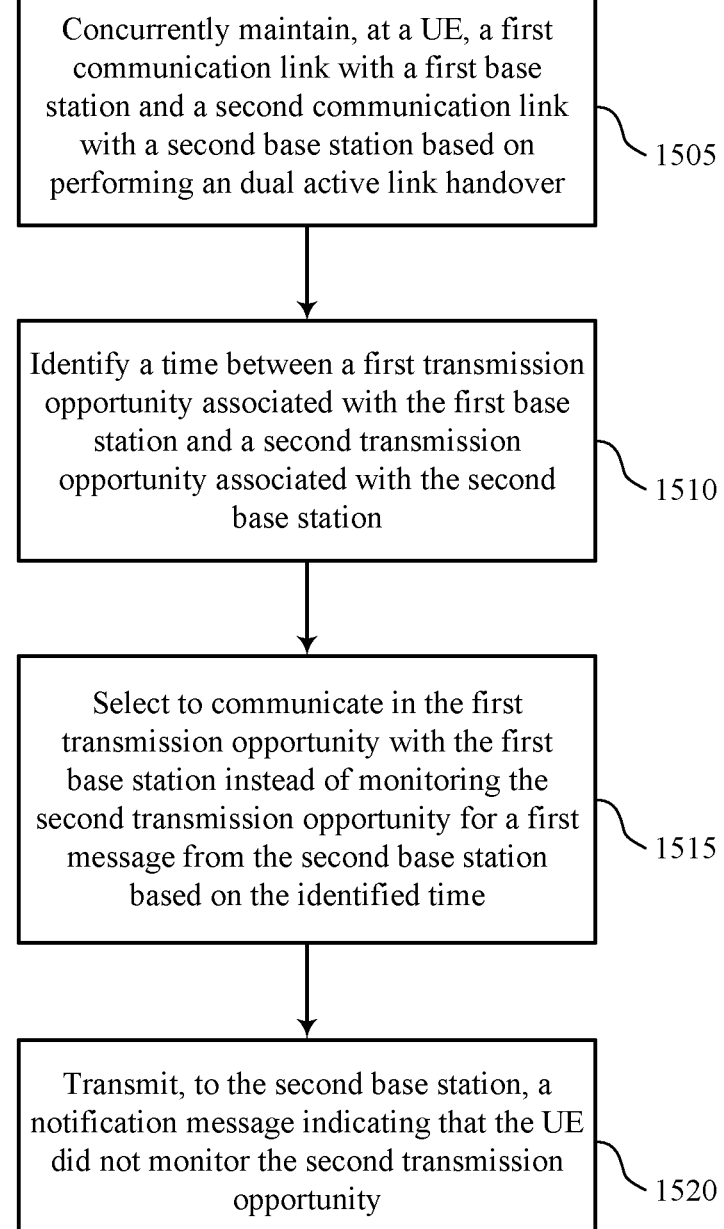

Concurrently maintain, at a UE, a first communication link with a first base station and a second communication link with a second base station based on performing an dual active link handover

1505

Identify a time between a first transmission opportunity associated with the first base station and a second transmission opportunity associated with the second base station

1510

Select to communicate in the first transmission opportunity with the first base station instead of monitoring the second transmission opportunity for a first message from the second base station based on the identified time

1515

Transmit, to the second base station, a notification message indicating that the UE did not monitor the second transmission opportunity

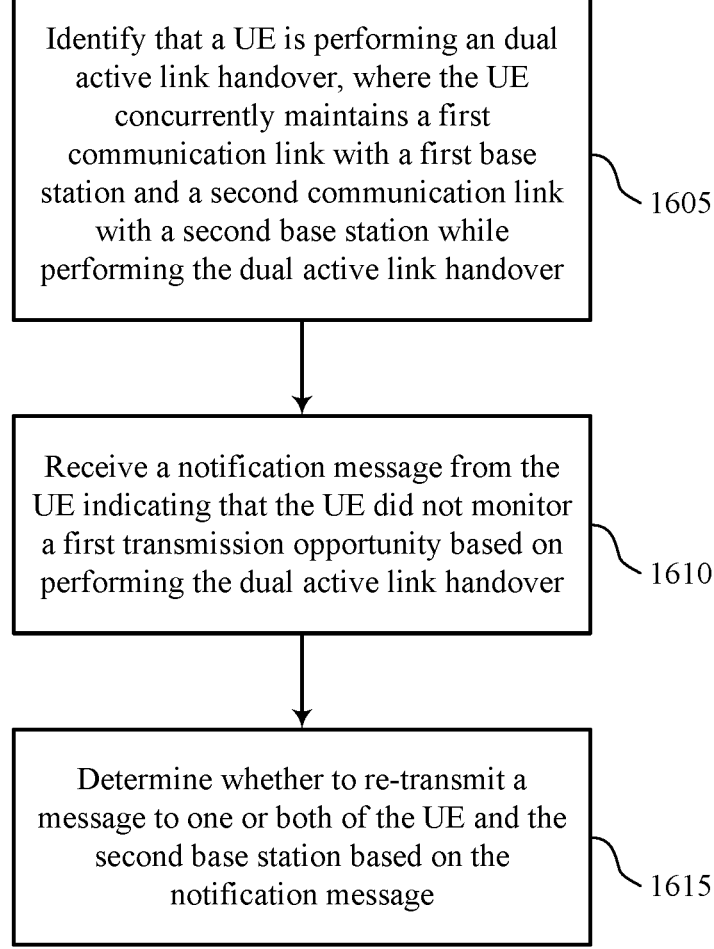

Identify that a UE is performing an dual active link handover, where the UE concurrently maintains a first communication link with a first base station and a second communication link with a second base station while performing the dual active link handover

1605

Receive a notification message from the UE indicating that the UE did not monitor a first transmission opportunity based on performing the dual active link handover

1610

Determine whether to re-transmit a message to one or both of the UE and the second base station based on the notification message

ERROR HANDLING IN DUAL ACTIVE LINK HANDOVER

CROSS REFERENCE

The present Application for Patent is a Divisional of U.S. patent application Ser. No. 17/012,911 by AWONIYI-OTERI et al., entitled "ERROR HANDLING IN DUAL ACTIVE LINK HANDOVER" filed Sep. 4, 2020, which claims the benefit of U.S. Provisional Patent Application No. 62/899,114 by AWONIYI-OTERI et al., entitled "ERROR HANDLING IN MAKE-BEFORE-BREAK HAN-DOVER," filed Sep. 11, 2019, assigned to the assignee hereof, and expressly incorporated by reference herein.

FIELD OF TECHNOLOGY

The following relates generally to wireless communications and more specifically to error handling in dual active link handover.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate with a base station using beamforming techniques. A UE may have multiple panels (e.g., antenna modules, antenna arrays, etc.) which are each able to form a communication beam (e.g., a reception beam) to receive a message from a base station. A UE may operate one panel at a time and may form a reception beam in one direction at a time. If a UE is connected to multiple base stations concurrently, the UE may drop data packets in transmissions from a first base station when the UE is using a communication beam to receive data packets in transmissions from a second base station. For example, the UE may not be able to switch in time to receive data packets from the first base station in a scheduled transmission opportunity due to communicating with the second base station in an overlapping or proximate transmission opportunity. Dropping packets when connected to multiple base stations may result in packet loss at the UE and significant latency involved in the UE successfully receiving the dropped packets.

SUMMARY

The described techniques relate to improved methods, systems, devices, and apparatuses that support error handling in dual active link handover. Generally, the described techniques provide for mitigating packet error rates, packet loss rates, or both during dual active link handover. For example, a UE may perform a dual active link handover procedure from a source base station to a target base station in order to reduce or remove an interruption time. In some cases, a dual active link handover may be referred to as a make-before-break (MBB) handover or a dual active protocol stack handover. During the dual active link handover procedure, the UE may have connections to both the source base station and the target base station concurrently. In such cases, transmission opportunities for communicating with the base stations may conflict (e.g., based on a time for the UE to switch from a first beam, bandwidth, and cell corresponding to a first base station to a second beam, bandwidth, and cell corresponding to a second base station). To handle conflicting transmission opportunities, the UE may drop a monitoring occasion or a packet reception for a base station based on prioritization rules, for example, in order to communicate in the other conflicting transmission opportunity with the other base station. In some cases, to mitigate packet losses, the base station may configure re-transmissions or slot aggregation to provide the UE with additional opportunities to receive a packet. Additionally or alternatively, the UE may transmit a notification message to a base station indicating any dropped monitoring occasions or packets, and, if the UE missed a packet due to the dropping, the base station may determine to re-send the missed packet to the UE (e.g., directly or via the other base station) based on the notification message.

A method for wireless communications at a UE is described. The method may include concurrently maintaining a first communication link with a first base station and a second communication link with a second base station based on performing a dual active link handover, identifying a time between a first transmission opportunity associated with the first base station and a second transmission opportunity associated with the second base station, selecting to communicate in the first transmission opportunity with the first base station instead of monitoring the second transmission opportunity for a message from the second base station based on the identified time, and monitoring a third transmission opportunity for the message from the second base station based on performing the dual active link handover.

An apparatus for wireless communications at a UE is described. The apparatus may include a processor, memory coupled with the processor, and instructions stored in the memory. The instructions may be executable by the processor to cause the apparatus to concurrently maintain a first communication link with a first base station and a second communication link with a second base station based on performing a dual active link handover, identify a time between a first transmission opportunity associated with the first base station and a second transmission opportunity associated with the second base station, select to communicate in the first transmission opportunity with the first base station instead of monitoring the second transmission opportunity for a message from the second base station based on the identified time, and monitor a third transmission opportunity for the message from the second base station based on performing the dual active link handover.

Another apparatus for wireless communications at a UE is described. The apparatus may include means for concurrently maintaining a first communication link with a first base station and a second communication link with a second base station based on performing a dual active link handover, identifying a time between a first transmission opportunity associated with the first base station and a second transmission opportunity associated with the second base station, selecting to communicate in the first transmission opportunity with the first base station instead of monitoring the second transmission opportunity for a message from the second base station based on the identified time, and monitoring a third transmission opportunity for the message from the second base station based on performing the dual active link handover.

A non-transitory computer-readable medium storing code for wireless communications at a UE is described. The code may include instructions executable by a processor to concurrently maintain a first communication link with a first base station and a second communication link with a second base station based on performing a dual active link handover, identify a time between a first transmission opportunity associated with the first base station and a second transmission opportunity associated with the second base station, select to communicate in the first transmission opportunity with the first base station instead of monitoring the second transmission opportunity for a message from the second base station based on the identified time, and monitor a third transmission opportunity for the message from the second base station based on performing the dual active link handover.

Some examples of the method, apparatuses, and non-transitory computer-readable medium described herein may further include operations, features, means, or instructions for identifying a configuration associated with performing the dual active link handover and determining a temporal relationship between the second transmission opportunity and the third transmission opportunity based on the configuration.

Some examples of the method, apparatuses, and non-transitory computer-readable medium described herein may further include operations, features, means, or instructions for receiving the configuration from one or both of the first base station and the second base station.

In some examples of the method, apparatuses, and non-transitory computer-readable medium described herein, the temporal relationship between the second transmission opportunity and the third transmission opportunity includes a re-transmission timer for re-transmission of the message missed during the second transmission opportunity when the UE may be performing the dual active link handover, where the re-transmission timer may be shorter than a default re-transmission timer.

Some examples of the method, apparatuses, and non-transitory computer-readable medium described herein may further include operations, features, means, or instructions for identifying a slot aggregation configuration associated with performing the dual active link handover, where monitoring the third transmission opportunity for the message may be based on the slot aggregation configuration.

In some examples of the method, apparatuses, and non-transitory computer-readable medium described herein, the slot aggregation configuration includes one or both of a number of repetitions of the message in a set of slots and a periodicity for repetitions of the message in the set of slots.

Some examples of the method, apparatuses, and non-transitory computer-readable medium described herein may further include operations, features, means, or instructions for selecting a configuration for one or both of the first communication link with the first base station and the second communication link with the second base station and transmitting, to one or both of the first base station and the second base station, an indication of the selected configuration, where monitoring the third transmission opportunity for the message may be based on the selected configuration.

Some examples of the method, apparatuses, and non-transitory computer-readable medium described herein may further include operations, features, means, or instructions for transmitting a notification message indicating that the UE did not monitor the second transmission opportunity, where monitoring the third transmission opportunity may be further based on transmitting the notification message.

Some examples of the method, apparatuses, and non-transitory computer-readable medium described herein may further include operations, features, means, or instructions for selecting a first communication beam for communicating with the first base station in the first transmission opportunity and a first bandwidth, where the UE may be configured to communicate using a single communication beam at a time, and determining that the identified time may be less than a threshold time for switching from the first communication beam for communicating with the first base station in the first bandwidth to a second communication beam for communicating with the second base station in a second bandwidth, where the selecting to communicate in the first transmission opportunity instead of monitoring the second transmission opportunity may be further based on the determining.

In some examples of the method, apparatuses, and non-transitory computer-readable medium described herein, the first transmission opportunity and the second transmission opportunity at least partially overlap in time.

A method for wireless communications at a first base station is described. The method may include identifying that a UE is performing a dual active link handover, where the UE concurrently maintains a first communication link with the first base station and a second communication link with a second base station while performing the dual active link handover, transmitting a message to the UE in a first transmission opportunity, and transmitting the message to the UE in a second transmission opportunity subsequent to the first transmission opportunity based on the UE performing the dual active link handover.

An apparatus for wireless communications at a first base station is described. The apparatus may include a processor, memory coupled with the processor, and instructions stored in the memory. The instructions may be executable by the processor to cause the apparatus to identify that a UE is performing a dual active link handover, where the UE concurrently maintains a first communication link with the first base station and a second communication link with a second base station while performing the dual active link handover, transmit a message to the UE in a first transmission opportunity, and transmit the message to the UE in a second transmission opportunity subsequent to the first transmission opportunity based on the UE performing the dual active link handover.

Another apparatus for wireless communications at a first base station is described. The apparatus may include means for identifying that a UE is performing a dual active link handover, where the UE concurrently maintains a first communication link with the first base station and a second communication link with a second base station while performing the dual active link handover, transmitting a message to the UE in a first transmission opportunity, and transmitting the message to the UE in a second transmission opportunity subsequent to the first transmission opportunity based on the UE performing the dual active link handover.

A non-transitory computer-readable medium storing code for wireless communications at a first base station is described. The code may include instructions executable by a processor to identify that a UE is performing a dual active link handover, where the UE concurrently maintains a first communication link with the first base station and a second communication link with a second base station while performing the dual active link handover, transmit a message to the UE in a first transmission opportunity, and transmit the message to the UE in a second transmission opportunity subsequent to the first transmission opportunity based on the UE performing the dual active link handover.

Some examples of the method, apparatuses, and non-transitory computer-readable medium described herein may further include operations, features, means, or instructions for configuring the UE with a configuration associated with the UE performing the dual active link handover, where the configuration indicates a temporal relationship between the first transmission opportunity and the second transmission opportunity.

In some examples of the method, apparatuses, and non-transitory computer-readable medium described herein, configuring the UE may include operations, features, means, or instructions for transmitting one or both of a configuration message and a dual active link handover command to the UE indicating the configuration.

In some examples of the method, apparatuses, and non-transitory computer-readable medium described herein, the temporal relationship between the first transmission opportunity and the second transmission opportunity includes a re-transmission timer for re-transmission of the message missed during the first transmission opportunity when the UE may be performing the dual active link handover, where the re-transmission timer for the re-transmission may be shorter than a default re-transmission timer.

Some examples of the method, apparatuses, and non-transitory computer-readable medium described herein may further include operations, features, means, or instructions for configuring the UE with a slot aggregation configuration associated with the UE performing the dual active link handover, where transmitting the message in the first transmission opportunity and in the second transmission opportunity may be based on the slot aggregation configuration.

In some examples of the method, apparatuses, and non-transitory computer-readable medium described herein, configuring the UE may include operations, features, means, or instructions for transmitting one or both of a configuration message and a dual active link handover command to the UE indicating the slot aggregation configuration, where the slot aggregation configuration includes one or both of a number of repetitions of the message in a set of slots and a periodicity for repetitions of the message in the set of slots.

Some examples of the method, apparatuses, and non-transitory computer-readable medium described herein may further include operations, features, means, or instructions for determining that the UE did not receive the message in the first transmission opportunity, where transmitting the message in the second transmission opportunity includes re-transmitting the message in the second transmission opportunity based on the determining.

Some examples of the method, apparatuses, and non-transitory computer-readable medium described herein may further include operations, features, means, or instructions for receiving, from the UE, a notification message indicating that the UE did not monitor the first transmission opportunity, where the determining may be based on the notification message.

Some examples of the method, apparatuses, and non-transitory computer-readable medium described herein may further include operations, features, means, or instructions for performing slot aggregation, where the message may be transmitted in the first transmission opportunity and the second transmission opportunity based on the slot aggregation.

In some examples of the method, apparatuses, and non-transitory computer-readable medium described herein, the first base station includes a source base station of the dual active link handover or a target base station of the dual active link handover.

A method for wireless communications at a UE is described. The method may include concurrently maintaining a first communication link with a first base station and a second communication link with a second base station based on performing a dual active link handover, identifying a time between a first transmission opportunity associated with the first base station and a second transmission opportunity associated with the second base station, selecting to communicate in the first transmission opportunity with the first base station instead of monitoring the second transmission opportunity for a first message from the second base station based on the identified time, and transmitting, to the second base station, a notification message indicating that the UE did not monitor the second transmission opportunity.

An apparatus for wireless communications at a UE is described. The apparatus may include a processor, memory coupled with the processor, and instructions stored in the memory. The instructions may be executable by the processor to cause the apparatus to concurrently maintain a first communication link with a first base station and a second communication link with a second base station based on performing a dual active link handover, identify a time between a first transmission opportunity associated with the first base station and a second transmission opportunity associated with the second base station, select to communicate in the first transmission opportunity with the first base station instead of monitoring the second transmission opportunity for a first message from the second base station based on the identified time, and transmit, to the second base station, a notification message indicating that the UE did not monitor the second transmission opportunity.

Another apparatus for wireless communications at a UE is described. The apparatus may include means for concurrently maintaining a first communication link with a first base station and a second communication link with a second base station based on performing a dual active link handover, identifying a time between a first transmission opportunity associated with the first base station and a second transmission opportunity associated with the second base station, selecting to communicate in the first transmission opportunity with the first base station instead of monitoring the second transmission opportunity for a first message from the second base station based on the identified time, and transmitting, to the second base station, a notification message indicating that the UE did not monitor the second transmission opportunity.

A non-transitory computer-readable medium storing code for wireless communications at a UE is described. The code may include instructions executable by a processor to concurrently maintain a first communication link with a first base station and a second communication link with a second base station based on performing a dual active link handover, identify a time between a first transmission opportunity associated with the first base station and a second transmission opportunity associated with the second base station, select to communicate in the first transmission opportunity with the first base station instead of monitoring the second transmission opportunity for a first message from the second base station based on the identified time, and transmit, to the second base station, a notification message indicating that the UE did not monitor the second transmission opportunity.

Some examples of the method, apparatuses, and non-transitory computer-readable medium described herein may further include operations, features, means, or instructions for receiving, from one or both of the first base station and the second base station, the first message in a third transmission opportunity based on the notification message.

Some examples of the method, apparatuses, and non-transitory computer-readable medium described herein may further include operations, features, means, or instructions for receiving, from the second base station, a configuration associated with performing the dual active link handover, where the configuration may be received based on the notification message.

In some examples of the method, apparatuses, and non-transitory computer-readable medium described herein, the configuration includes one or both of a re-transmission timer for re-transmission of the first message missed during the second transmission opportunity when the UE may be performing the dual active link handover indicating a temporal relationship between the second transmission opportunity and the third transmission opportunity and a slot aggregation configuration including one or both of a number of repetitions of the first message in a set of slots and a periodicity for repetitions of the first message in the set of slots.

Some examples of the method, apparatuses, and non-transitory computer-readable medium described herein may further include operations, features, means, or instructions for receiving a slot aggregation configuration associated with performing the dual active link handover, where the slot aggregation configuration includes a number of repetitions of the first message in a set of slots and the notification message includes an indication of one or both of which repetitions are missed and how many repetitions are missed.

In some examples of the method, apparatuses, and non-transitory computer-readable medium described herein, the second transmission opportunity corresponds to a monitoring occasion for a control channel message or a downlink grant for a data channel message.

In some examples of the method, apparatuses, and non-transitory computer-readable medium described herein, the notification message further indicates one or both of a search space schedule for the first base station and a periodic data transmission schedule for the first base station.

In some examples of the method, apparatuses, and non-transitory computer-readable medium described herein, transmitting the notification message may include operations, features, means, or instructions for transmitting a scheduled uplink message to the second base station, where the scheduled uplink message includes the notification message.

In some examples of the method, apparatuses, and non-transitory computer-readable medium described herein, transmitting the notification message may include operations, features, means, or instructions for transmitting the notification message in a grant-free uplink resource.

In some examples of the method, apparatuses, and non-transitory computer-readable medium described herein, the notification message indicates a type of channel associated with the second transmission opportunity, a search configuration for the second transmission opportunity, a timing occasion for the second transmission opportunity, or a combination thereof.

Some examples of the method, apparatuses, and non-transitory computer-readable medium described herein may further include operations, features, means, or instructions for selecting a first communication beam for communicating with the first base station in the first transmission opportunity and a first bandwidth, where the UE may be configured to communicate using a single communication beam at a time, and determining that the identified time may be less than a threshold time for switching from the first communication beam for communicating with the first base station in the first bandwidth to a second communication beam for communicating with the second base station in a second bandwidth, where the selecting to communicate in the first transmission opportunity instead of monitoring the second transmission opportunity may be further based on the determining.

In some examples of the method, apparatuses, and non-transitory computer-readable medium described herein, the first transmission opportunity and the second transmission opportunity at least partially overlap in time.

A method for wireless communications at a first base station is described. The method may include identifying that a UE is performing a dual active link handover, where the UE concurrently maintains a first communication link with the first base station and a second communication link with a second base station while performing the dual active link handover, receiving a notification message from the UE indicating that the UE did not monitor a first transmission opportunity based on performing the dual active link handover, and determining whether to re-transmit a message to one or both of the UE and the second base station based on the notification message.

An apparatus for wireless communications at a first base station is described. The apparatus may include a processor, memory coupled with the processor, and instructions stored in the memory. The instructions may be executable by the processor to cause the apparatus to identify that a UE is performing a dual active link handover, where the UE concurrently maintains a first communication link with the first base station and a second communication link with a second base station while performing the dual active link handover, receive a notification message from the UE indicating that the UE did not monitor a first transmission opportunity based on performing the dual active link handover, and determine whether to re-transmit a message to one or both of the UE and the second base station based on the notification message.

Another apparatus for wireless communications at a first base station is described. The apparatus may include means for identifying that a UE is performing a dual active link handover, where the UE concurrently maintains a first communication link with the first base station and a second communication link with a second base station while performing the dual active link handover, receiving a notification message from the UE indicating that the UE did not monitor a first transmission opportunity based on performing the dual active link handover, and determining whether to re-transmit a message to one or both of the UE and the second base station based on the notification message.

A non-transitory computer-readable medium storing code for wireless communications at a first base station is described. The code may include instructions executable by a processor to identify that a UE is performing a dual active link handover, where the UE concurrently maintains a first communication link with the first base station and a second communication link with a second base station while performing the dual active link handover, receive a notification message from the UE indicating that the UE did not monitor a first transmission opportunity based on performing the dual active link handover, and determine whether to re-transmit a message to one or both of the UE and the second base station based on the notification message.

Some examples of the method, apparatuses, and non-transitory computer-readable medium described herein may further include operations, features, means, or instructions for transmitting the message to the UE in the first transmission opportunity and re-transmitting the message to the UE in a second transmission opportunity based on the determining.

Some examples of the method, apparatuses, and non-transitory computer-readable medium described herein may further include operations, features, means, or instructions for transmitting, to the UE, a configuration associated with the UE performing the dual active link handover based on the notification message, where re-transmitting the message in the second transmission opportunity may be based on the configuration.

In some examples of the method, apparatuses, and non-transitory computer-readable medium described herein, the configuration includes one or both of a re-transmission timer for re-transmission of the message missed during the first transmission opportunity when the UE may be performing the dual active link handover indicating a temporal relation-ship between the first transmission opportunity and the second transmission opportunity and a slot aggregation configuration including one or both of a number of repeti-tions of the message in a set of slots and a periodicity for repetitions of the message in the set of slots.

In some examples of the method, apparatuses, and non-transitory computer-readable medium described herein, the notification message further indicates one or both of a search space schedule for the second base station and a periodic data transmission schedule for the second base station, where the second transmission opportunity may be based on one or both of the search space schedule for the second base station and the periodic data transmission schedule.

Some examples of the method, apparatuses, and non-transitory computer-readable medium described herein may further include operations, features, means, or instructions for transmitting, to the UE, a slot aggregation configuration associated with the UE performing the dual active link handover, where the slot aggregation configuration includes a number of repetitions of the message in a set of slots and the notification message includes an indication of one or both of which repetitions are missed and how many repeti-tions are missed by the UE.

Some examples of the method, apparatuses, and non-transitory computer-readable medium described herein may further include operations, features, means, or instructions for transmitting the message to the UE in the first transmis-sion opportunity and forwarding the message to the second base station based on the notification message.

Some examples of the method, apparatuses, and non-transitory computer-readable medium described herein may further include operations, features, means, or instructions for identifying that the first transmission opportunity is unused.

In some examples of the method, apparatuses, and non-transitory computer-readable medium described herein, the first transmission opportunity corresponds to a monitoring occasion for a control channel message or a downlink grant for a data channel message.

In some examples of the method, apparatuses, and non-transitory computer-readable medium described herein, receiving the notification message may include operations, features, means, or instructions for receiving a scheduled uplink message from the UE, where the scheduled uplink message includes the notification message.

In some examples of the method, apparatuses, and non-transitory computer-readable medium described herein, receiving the notification message may include operations, features, means, or instructions for receiving the notification message in a grant-free uplink resource.

In some examples of the method, apparatuses, and non-transitory computer-readable medium described herein, the notification message indicates a type of channel associated with the first transmission opportunity, a search configura-tion for the first transmission opportunity, a timing occasion for the first transmission opportunity, or a combination thereof.

In some examples of the method, apparatuses, and non-transitory computer-readable medium described herein, the first base station includes a source base station of the dual active link handover or a target base station of the dual active link handover.

BRIEF DESCRIPTION OF THE DRAWINGS

FIGS. 13 through 16 show flowcharts illustrating methods that support error handling in dual active link handover in accordance with aspects of the present disclosure.

DETAILED DESCRIPTION

Figure 1:
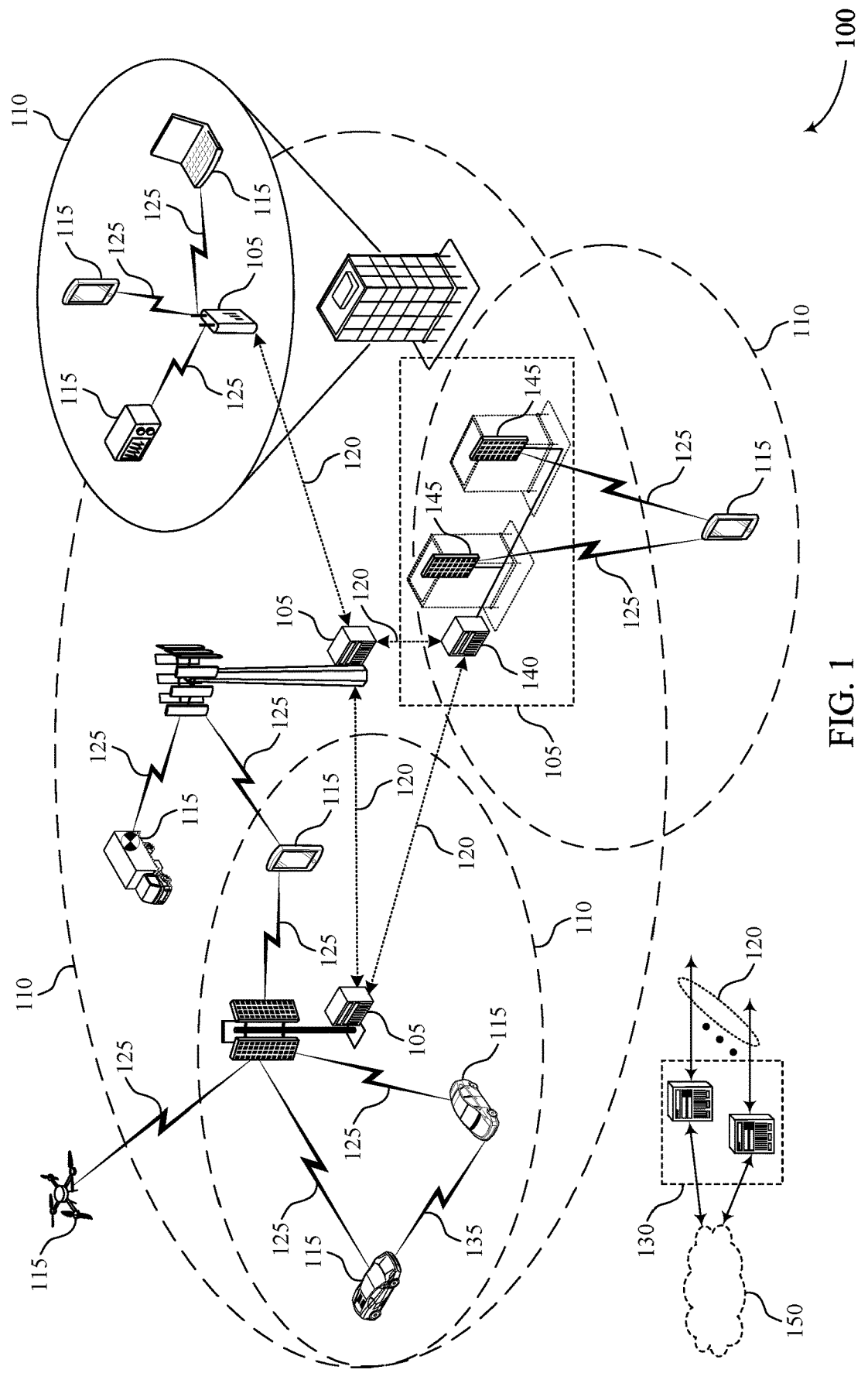
FIGS. 1 and 2 illustrate examples of wireless communi-cations systems that support error handling in dual active link handover in accordance with aspects of the present disclosure.

In some wireless communications systems, base stations may hand off one or more UEs using dual active link handover procedures (e.g., for reduced interruption times). In some cases, a dual active link handover may be referred to as an MBB handover or a dual active protocol stack handover. A UE performing dual active link handover may communicate with multiple base stations when transitioning between the cells. For example, during the dual active link handover process, the UE may maintain an established connection with a source base station supporting a source cell while establishing a new connection with a target base station supporting a target cell. The source base station and the target base station may not coordinate scheduling, in some cases resulting in conflicting transmission opportunities at the UE. For example, the UE may form a reception beam in one direction at a time (e.g., based on a UE capability or configuration). As such, the UE may not be able to concurrently receive transmissions from both the source base station and the target base station. If the source base station and the target base station schedule UE reception in resources too close together (e.g., in overlapping time resources or in non-overlapping time resources that do not allow enough time for the UE to switch between communication configurations for the different base stations), the UE may select to communicate with one of the base stations and may drop communications with the other base station. These communications may include downlink transmissions, uplink transmissions, or a combination thereof.

If the UE drops a transmission opportunity for a base station (e.g., refrains from monitoring a monitoring occasion or refrains from receiving a scheduled packet), the UE may introduce packet loss, latency, or both into the system. To mitigate the packet loss and latency, the UE, base stations, or both may implement one or more techniques to handle dual active link handover operations. In some cases, to mitigate packet losses, a base station (e.g., the source base station, the target base station, or both) may configure re-transmissions or slot aggregation to provide the UE with additional opportunities to receive a packet. For example, the base station may implement a shortened re-transmission timer for packets during dual active link handover. Additionally or alternatively, the base station may implement slot aggregation, such that the base station transmits multiple repetitions of a packet to the UE (e.g., without waiting for a response from the UE). If the UE drops a transmission opportunity, the UE may perform slot aggregation on the non-dropped transmission opportunities (e.g., for other repetitions) to successfully receive the packet.

In some cases, the UE may transmit a notification message to a base station indicating any dropped monitoring occasions or packets. For example, the UE may indicate the transmission opportunity that the UE did not monitor (e.g., in a notification message or as part of another uplink message), and the base station may determine if a packet was missed in this transmission opportunity. If so, the base station may re-transmit the packet to the UE based on the notification message (e.g., either directly or via the other connected base station). This notification message may reduce the latency involved in the UE receiving a dropped packet. In some examples, the base station may implement slot aggregation, low latency re-transmissions, or both in addition to the UE-assisted recovery using the notification messaging.

Aspects of the disclosure are initially described in the context of wireless communications systems. Aspects of the disclosure are further illustrated by and described with reference to process flows, diagrams, and flowcharts that relate to message handling in dual active link handover.

FIG. 1 illustrates an example of a wireless communications system 100 that supports error handling in dual active link handover in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a base station 105 may transmit a data transmission (e.g., a physical downlink shared channel (PDSCH) transmission), a control transmission (a physical downlink control channel (PDCCH) transmission), or the like to a UE 115 using a transmission configuration indicator (TCI) state (e.g., corresponding to a beamformed transmission). The UE 115 may use information about the TCI state to configure receivers of the UE 115 to receive the beamformed transmission.

The UE 115 may communicate with multiple base stations 105 when transitioning between cells supported by different base stations 105. For example, during a dual active link handover process, the UE 115 may communicate with both a target base station 105 supporting a target cell and a source base station 105 supporting a source cell (e.g., concurrently operating using a first active communication link to the source base station 105 and a second active communication link to the target base station 105, such that the UE 115 operates with dual active communication links). In some cases, transmissions from the source and target base stations to the UE 115 may overlap in time (e.g., concurrent transmissions). In some examples, the UE 115 may perform TDM techniques on the physical control channels, physical data channels, or a combination thereof to communicate with the source and target base stations. The source and target base stations may schedule transmissions and search spaces independent of each other (e.g., without physical layer coordination), which may lead to transmissions overlapping in time or being proximate in time. The UE 115 may form a reception beam in one direction at a time (e.g., based on a UE capability or configuration). In some cases, the UE 115 may select the reception beam to utilize based on a default beam selection procedure. The UE 115 may determine a default beam to use based on various prioritization metrics (e.g., target versus source base station priority, control channel versus data channel priority, quality of service (QoS) thresholds for the traffic carried on a channel, etc.). Choosing a default beam may result in the UE 115 dropping a transmission from the source or target base station 105 depending on which beam was not selected. For example, if the UE 115 selects the default beam for communicating with the target base station 105, the UE 115 may drop monitoring occasions or packet reception opportunities for the source base station 105 if the UE 115 does not have enough time to switch beams, cells, bandwidths, or some combination thereof.

In some examples, the transmissions from the target and source base stations 105 may not be overlapping in time. However, the UE 115 may not be able to switch from receiving data packets from one base station 105 to receiving additional data packets from another base station 105 in time to receive the additional data packets (e.g., based on the processes involved in configuring a communication beam, a bandwidth, a cell, a radio frequency (RF) configuration, etc.). The UE 115 may drop monitoring for and receiving a packet during the dual active link handover process based on overlapping or proximate transmission opportunities for the different base stations 105. For example, if the UE 115 communicates with a first base station 105 in a first cell, on a first frequency, in a first bandwidth, using a first communication beam, according to a first RF configuration, etc., the UE 115 may drop a transmission opportunity associated with a second base station 105 based on not having enough time to switch to a second cell, a second frequency, a second bandwidth, a second communication beam, a second RF configuration, or some combination thereof.

To mitigate the packet loss or packet error rate at the UE 115, a base station 105 may implement one or more techniques to handle dropping communications in dual active link handover processes. The base station 105 (e.g., a source or target base station 105) may instruct the UE 115 to trigger the dual active link handover process or may detect that the UE 115 is performing the dual active link handover process. Accordingly, the base station 105 may identify when the UE 115 starts and ends the dual active link handover process (i.e., when the UE 115 may be connected to multiple base stations 105). The target and source base stations 105 may not coordinate as to the scheduling and timing of communications with the UE 115. The dual active link handover process may be triggered when a UE 115 is moving into the coverage area 115 of another cell (e.g., a cell supported by the target base station 105), when the channel quality between the UE 115 the source base station 105 falls below a threshold value, etc.

In some examples, a base station 105 may configure the UE 115 such that the UE 115 may effectively handle dropping a packet when the UE 115 is in the dual active link handover process and connected to both base stations 105. In a first example, the base station 105 may indicate a timeline for re-transmission (e.g., by defining a re-transmission timer for packets during dual active link handover operations). In a second example, the base station 105 may indicate a slot aggregation configuration for the UE 115.

In some examples, the source base station 105 may transmit a configuration message (e.g., a handover command indicating dual active link operation, a handover message, or any other configuration message) to the UE 115. The configuration message may indicate to the UE 115 that the source base station 105, the target base station 105, or both are implementing slot aggregation during the dual active link handover. If the UE 115 identifies the configuration for slot aggregation from the source base station 105, the UE 115 may prioritize transmissions from the target base station 105 (e.g., as the slot aggregation configuration at the source base station 105 may provide additional redundancy for transmissions from the source base station 105). In some examples, the base station 105 may configure the configuration message with configurations for slot aggregation and re-transmissions, and the UE 115 may select a configuration.

The UE 115 may transmit an indication of the selected configuration back to the base station 105.

In some cases, the base station 105 may maintain a timer for determining when to re-transmit packets. The base station 105 may activate the re-transmission timer following a packet transmission (e.g., and following activation and expiry of a round-trip time (RTT) timer). If the base station 105 does not receive a response from the UE 115 in a threshold amount of time after the base station 105 transmits the packet (e.g., a control channel message, a data message, etc.), the re-transmission timer may expire and the base station 105 may re-transmit the packet (e.g., in a next available transmission opportunity). The base station 105 may implement a re-transmission timer during dual active link handover operations different from a default re-transmission timer (e.g., a re-transmission timer used when a UE 115 is not performing a dual active link handover process). The re-transmission timer for packet re-transmission during dual active link handover may have a shorter timer length than the default re-transmission timer (e.g., to account for the greater likelihood of missed packets at the UE 115).

Additionally or alternatively, the base station 105 may transmit packets using slot aggregation. During the dual active link handover process, the base station 105 may reduce the search space periodicity, enable slot aggregation, or both. This may ensure that the UE 115 has multiple opportunities to receive a transmission (e.g., PDCCH messages, PDSCH messages, etc.) from the source base station 105, the target base station 105, or both. The base station 105 may indicate to the UE 115 that the slot aggregation configuration includes a number of transmissions, N, of data that will be sent in consecutive slots or a specific number of slots. The UE 115 may aggregate the data in the slots for better performance, since the UE 115 may identify the amount of data and location of the data in the indicated number of slots. If the UE 115 drops a transmission opportunity during dual active link handover, the UE 115 may aggregate the received packets in the non-dropped transmission opportunities of the slot aggregation configuration. Implementing slot aggregation may improve the probability that the UE 115 may receive the concurrent or proximate transmissions from the source and target base stations 105.

In some examples, the UE 115 may notify the source or target base stations 105 of any transmissions which the UE 115 did not detect or receive from the source or target base stations 105. For example, based on a configuration (e.g., a search space configuration, a CORESET configuration, etc.), the UE 115 may monitor particular resources of a control channel (e.g., a monitoring occasion) for a PDCCH candidate. In some cases, the monitoring may be according to a periodicity of PDCCH candidates. A base station 105 may or may not transmit a downlink control information (DCI) message in each control channel monitoring occasion. However, in some cases, a UE 115 operating in dual active link handover may refrain from monitoring one or more monitoring occasions (e.g., based on conflicting transmission opportunities for a different base station 105). The UE 115 may inform the corresponding base station 105 if the UE 115 did not monitor a monitoring occasion for a transmission. In some examples, not monitoring for a transmission may be referred to as "dropping" a transmission or packet. Additionally or alternatively, if the UE 115 receives a downlink grant with a slot indication from the base station 105, the UE 115 may monitor the indicated slot for downlink data. If the UE 115 drops monitoring the indicated slot (e.g., based on a conflicting transmission opportunity for another base station 105), the UE 115 may send a notification message to the base station 105 indicating that the UE 115 did not monitor the slot (or failed to receive the downlink data). The notification message may be an example of or similar to a negative acknowledgment (NACK) message. The notification message may include the type of channel (e.g., PDCCH, PDSCH, etc.), the search configuration, timing information (e.g., a slot number for a scheduled PDSCH), frequency information, or some combination of these or other relevant identification information for the dropped opportunity.

In some cases, the UE 115 may identify the schedule of the prioritized cell with which it is communicating. For example, the UE 115 may be connected to the target base station 105 (e.g., which may be prioritized) and may receive scheduling information for the target cell. The UE 115 may send this information to the source base station 105 (e.g., in a notification message) so that the source base station 105 may coordinate scheduling based on the target cell.

In some examples, the UE 115 may inform the target or source base station 105 that the UE 115 did not monitor during a transmission opportunity. This information may trigger the base station 105 to implement slot aggregation for a packet or packet re-transmission (e.g., if a control channel was dropped). In some cases, the UE 115 may implement UE-assisted recovery in conjunction with base station-triggered techniques. For example, if a base station 105 implements slot aggregation, the UE 115 may inform the base station 105 which slots the UE 115 did not monitor or receive. For example, if the UE 115 received three out of four of the slots in the slot aggregation configuration, the base station 105 may not re-transmit (as this may include enough information for the UE 115 to aggregate and successfully determine the information). However, if the UE 115 informs the base station 105 that the UE 115 received one out of four of the slots, the base station 105 may re-transmit the packet.

In some examples, the UE 115 may send the notification information for dropped transmission opportunities to the base station 105 by piggy-backing the notification on a subsequent scheduled uplink message (e.g., a physical uplink shared channel (PUSCH) transmission, a physical uplink control channel (PUCCH) transmission, or both) to the source or target base station 105. In some other examples, the source or target base station 105 may configure the UE 115 with dedicated grant-free PUSCH resources during the dual active link handover process. The target or source base station 105 may indicate to the UE 115 that the UE 115 may use this grant-free PUSCH to transmit a notification message indicating if any packets are dropped.

Figure 2:
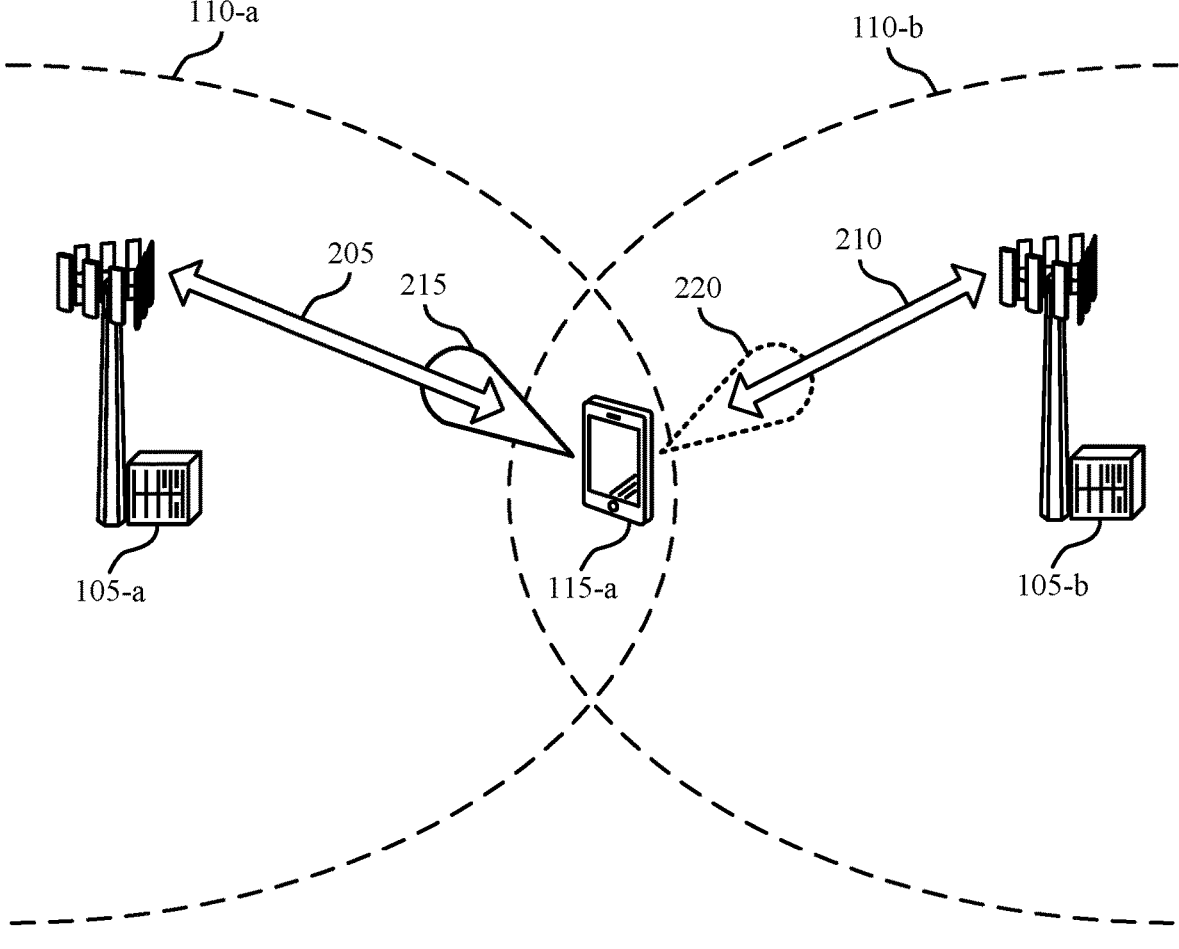

FIG. 2 illustrates an example of a wireless communications system 200 that supports error handling in dual active link handover in accordance with aspects of the present disclosure. In some examples, the wireless communications system 200 may implement aspects of the wireless communication system 100. For example, the wireless communications system 200 may include base stations 105-*a* and 105-*b* and UE 115-*a*, which may be examples of the corresponding devices described with reference to FIG. 1. UE 115-*a* may communicate with base stations 105-*a* and 105-*b* in a beamforming communication system.

In the wireless communications system 200, base station 105-*a*, base station 105-*b*, and UE 115-*a* may operate using dual active link handover techniques. A source base station 105-*a* (e.g., the source base station to UE 115-*a*) may communicate with UE 115-*a* in coverage area 110-*a* over communication channel 205. Coverage area 110-*a* may correspond to a first cell (e.g., a source cell) for the UE 115-*a*. UE 115-*a* may receive a downlink message (e.g., PDCCH/PDSCH information) from base station 105-*a* over reception beam 215 (e.g., an active communication beam at UE 115-*a*). A target base station 105-*b* (e.g., the target base station to UE 115-*a* during dual active link handover) may communicate with UE 115-*a* in coverage area 110-*b* over communication channel 210, where the target base station 105-*b* serves a second cell (e.g., a target cell) for the UE 115-*a*. UE 115-*a* may receive the PDCCH/PDSCH from base station 105-*b* over reception beam 220.

Wireless devices may select default beams for communication based on a set of rules. Beams used for communications (e.g., of PDCCH/PDSCH information) may be derived from measurements made from synchronization signal blocks (SSBs), CSI-RSs, or both. For control transmissions, the medium access control (MAC) indicated TCI state, for the CORESET associated with the PDCCH, may indicate the associated spatial filter (i.e., the beam) used for PDCCH transmission. A first CORESET (e.g., CORESET 0) may use the beam identified during an initial access procedure.

For data transmissions, the PDSCH TCI state may follow the CORESET 0 if no other CORESETs are configured except for CORESET 0. In some examples, the PDCCH for scheduling may carry a non-fallback DCI. The associated TCI states for the PDSCH may be indicated by a three bit indicator. In some cases, when the K0 value (e.g., the value indicating timing for a granted data transmission with respect to the DCI message granting the data transmission resources) for a PDSCH transmission is greater than a threshold, the PDSCH default beam may be based on the indicated TCI state. In other cases, when the K0 value is less than or equal to the threshold, the PDSCH default beam may follow that of the scheduling PDCCH.

In some cases, the PDSCH TCI state may not be indicated in the scheduling PDCCH (e.g., if there is no non-fallback DCI). In some cases, when the K0 value for the PDSCH transmission is greater than a threshold, the PDSCH default beam may be based on the TCI state of the CORESET, to be monitored in the latest scheduled search space with the lowest index. In other cases, when the K0 value is less than or equal to the threshold, the PDSCH default beam may follow that of the scheduling PDCCH.

UE 115-*a* may select a default beam for communication using similar rules when operating in dual active link handover. In some cases, based on prioritization rules, UE 115-*a* may select a default beam corresponding to either base station 105-*a* or base station 105-*b*. Base station 105-*a* can transmit a first data packet to UE 115-*a* concurrent to (or proximate to) base station 105-*b* transmitting a second data packet to UE 115-*a*. UE 115-*a* may be unable to form reception beam 215 and reception beam 220 at the same time to receive the concurrent or proximate transmissions. UE 115-*a* may form reception beam 215 (e.g., the default beam for reception from base station 105-*a* based on prioritization rules), which may result in a transmission from target base station 105-*b* being dropped. A transmission may also be dropped if UE 115-*a* does not have enough time to switch between reception beams 215 and 220 to receive a transmission from source base station 105-*a* and target base station 105-*b*. For example, switching these beams may involves switching beams, bandwidths, cells, etc.

The source base station 105-*a* or target base station 105-*b* may configure UE 115-*a* to handle dropping a data packet when UE 115-*a* is in a dual active link handover process. In some examples, target base station 105-*b* may include, in a dual active link handover message (or another downlink message), an indication for re-transmissions or a configuration for slot aggregation to handle dropped transmissions. UE 115-*a* may send an indication to target base station 105-*b* to re-transmit according to a particular re-transmission schedule or timer or may send a configuration for slot aggregation to handle dropped transmissions. In some other examples, source base station 105-*a* may include a configuration for UE 115-*a* in the dual active link handover command, or source base station 105-*a*, target base station 105-*b*, or both may include the configuration for UE 115-*a* in a configuration message (e.g., prior to or during dual active link handover).

In some cases, target base station 105-*b* may maintain one or more re-transmission timers. If target base station 105-*b* transmits a packet to UE 115-*a* and does not receive a response from UE 115-*a* before expiry of the re-transmission timer (or base station 105-*b* receives a NACK while the timer is running from UE 115-*a*), target base station 105-*b* may re-transmit the packet. In some other cases, target base station 105-*b* may transmit data using slot aggregation. During the dual active link handover process, target base station 105-*b* may reduce the search space periodicity, enable slot aggregation, or both to ensure UE 115-*a* has additional opportunities to receive a dropped packet. Target base station 105-*b* may indicate to UE 115-*a* the slot aggregation configuration. The slot aggregation configuration may indicate a number of repetitions, N, that will be sent in consecutive slots, a particular number of slots, a slot periodicity, or a combination thereof. UE 115-*a* may receive the transmitted information (e.g., data) in the indicated slots and may aggregate the information for better decoding performance. During overlapping or non-overlapping conflicting transmissions from source base station 105-*a* and target base station 105-*b*, UE 115-*a* may be able to receive a transmission by aggregating the data from non-dropped occasions in the slot aggregation configuration. Implementing slot aggregation may improve the probability that UE 115-*a* may receive the simultaneous or temporally proximate transmissions from source base station 105-*a* and target base station 105-*b*.

In some examples, UE 115-*a* may notify target base station 105-*b* that UE 115-*a* has dropped a transmission. For example, UE 115-*a* may monitor a control channel for PDCCH candidates based on a configuration (e.g., including a periodicity). In some cases, UE 115-*a* may additionally monitor resources for grant-free PDSCH transmissions (e.g., with K0=0). Additionally, if UE 115-*a* receives a slot indication from target base station 105-*b* for a PDSCH grant (e.g., UE 115-*a* successfully decodes a scheduling PDCCH including K0>0 for the corresponding PDSCH grant), the UE 115-*a* may monitor the indicated slot for downlink data. In some examples, UE 115-*a* may "drop" a transmission. For example, UE 115-*a* may not monitor for a PDCCH message or PDSCH message based on a conflicting transmission opportunity for a different base station 105. In some such examples, UE 115-*a* may transmit a message (e.g., in a UE-assisted recovery procedure) to the base station 105 indicating the dropped transmission. The message may include the type of channel (e.g., a PDCCH configuration, a PDSCH configuration, etc.), the timing occasion (e.g., a slot number in which the PDSCH is located), or other identifying information for the dropped transmission such that the base station 105 receiving the message may determine which monitoring occasion was missed at UE 115-*a*. In some examples, UE 115-*a* may be identify the schedules (e.g., the periodic schedules) for each of the connected base stations 105. UE 115-*a* may send scheduling information for one base station (e.g., target base station 105-*b*) to the other base station (e.g., source base station 105-*a*) so that the source base station 105-*a* may avoid the scheduling of the target cell to limit the dropping of transmissions. Additionally or alternatively, wireless devices may implement the dual active link handover techniques for uplink transmissions (e.g., PUSCH/PUCCH).

In some examples, UE 115-*a* may inform target base station 105-*b* or source base station 105-*a* that it did not monitor for the data or UE 115-*a* dropped the data. This information may trigger source base station 105-*a* or target base station 105-*b* to implement slot aggregation for the data or re-transmission (e.g., if a control channel was dropped). UE 115-*a* may send this information by piggy-backing the notification on the next scheduled PUSCH or PUCCH transmission to the source base station 105-*a* or target base station 105-*b*. For example, the notification may be included as a header of a scheduled uplink message. In some examples, source base station 105-*a* or target base station 105-*b* may configure UE 115-*a* with periodic, dedicated, grant-free PUSCH resources during the dual active link handover. UE 115-*a* may transmit the notification message indicating any dropped monitoring occasions or packets in the grant-free PUSCH resources.

In some cases, if a non-prioritized base station 105 receives a notification message indicating that reception of a packet was dropped at UE 115-*a*, the non-prioritized base station 105 may send the packet to a prioritized base station 105 for more reliable transmission. For example, a base station (e.g., source base station 105-*a*) may forward a data packet, to transmit to UE 115-*a*, to another base station (e.g., target base station 105-*b*) via a backhaul connection. Target base station 105-*b* may transmit the data packet to UE 115-*a*. UE 115-*a* may not drop the data packet due to UE 115-*a* receiving the data packet from target base station 105-*b* (e.g., rather than from source base station 105-*a*).

Figure 3:
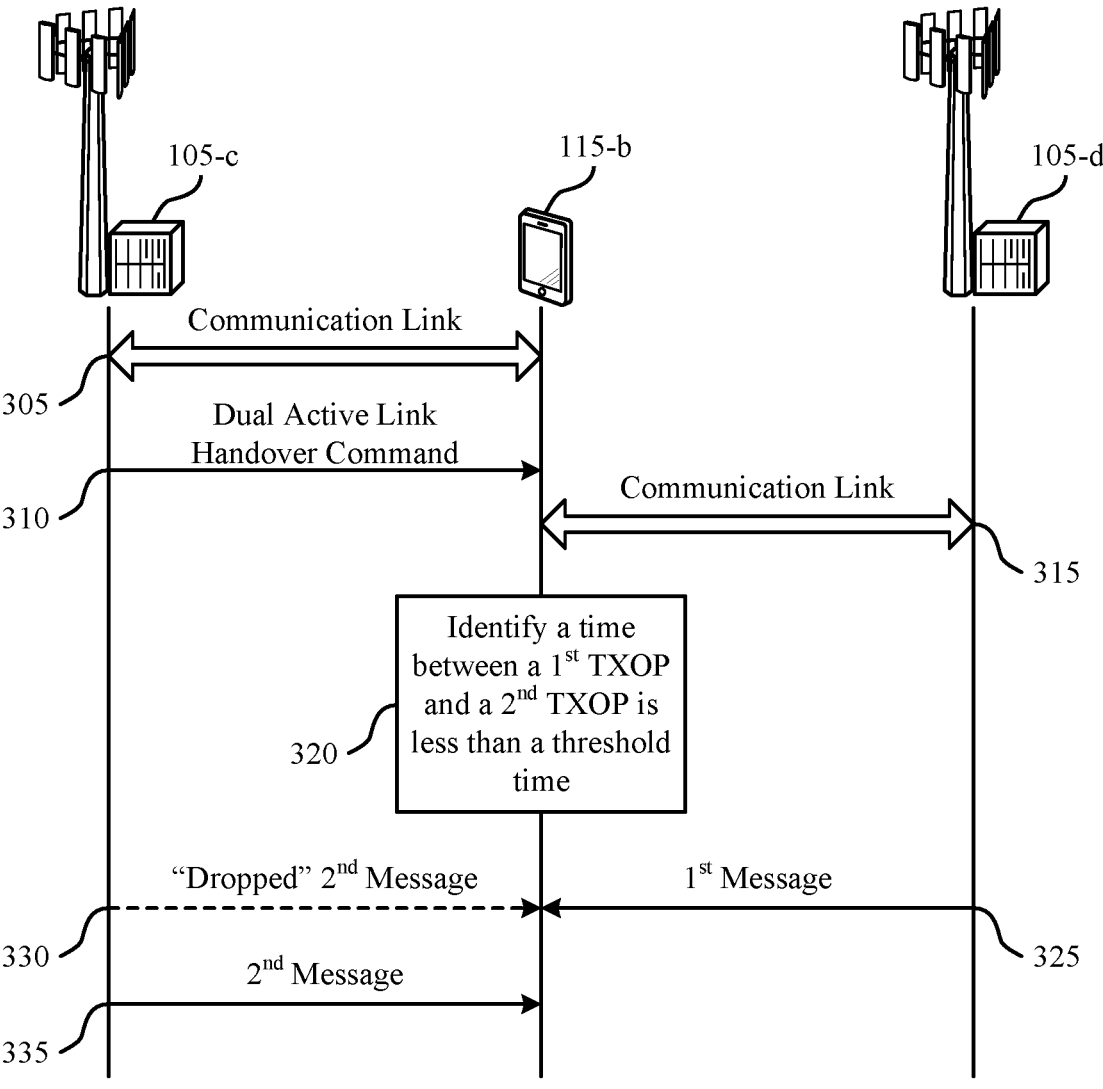
FIGS. 3 and 4 illustrate examples of process flows that support error handling in dual active link handover in accordance with aspects of the present disclosure.

FIG. 3 illustrates an example of a process flow 300 that supports error handling in dual active link handover in accordance with aspects of the present disclosure. In some examples, the process flow 300 may implement aspects of wireless communications systems 100 or 200 as described with reference to FIGS. 1 and 2. The process flow 300 may include a UE 115-*b* and base stations 105-*c* and 105-*d*, which may be examples of the corresponding devices described with reference to FIGS. 1 and 2. UE 115-*b* may perform a dual active link handover procedure to transition a connection from a source base station (e.g., base station 105-*c*) to a target base station (e.g., base station 105-*d*). During the dual active link handover procedure, based on a lack of coordination (e.g., scheduling coordination at the physical layer) between the base stations 105-*c* and 105-*d*, UE 115-*b* may not have enough time to switch beams, bandwidths, cells, etc. in order to communicate in scheduled opportunities with both of the base stations 105. Accordingly, UE 115-*b*, base station 105-*c*, base station 105-*d*, or a combination thereof may implement techniques to mitigate packet loss if UE 115-*b* drops a scheduled communication opportunity with one of the base stations 105. Alternative examples of the following may be implemented, where some steps are performed in a different order than described or are not performed at all. In some cases, steps may include additional features not mentioned below, or further steps may be added.

At 305, base station 105-*c* and UE 115-*b* may establish a first communication link. At 310, base station 105-*c* may transmit a handover command (e.g., a dual active link handover command) to UE 115-*b* indicating a handover of UE 115-*b* from the source base station (e.g., base station 105-*c*) to a target base station (e.g., base station 105-*d*). For example, base station 105-*c* may determine to handover UE 115-*b* based on a link quality between base station 105-*c* and UE 115-*b*, a distance from UE 115-*b* to base station 105-*c*, a distance from UE 115-*b* to base station 105-*d*, a mobility pattern of UE 115-*b*, or any combination of these or other handover triggers. Based on the dual active link handover command, at 315, UE 115-*b* may establish a second communication link with base station 105-*d*. By performing dual active link operations, UE 115-*b* may concurrently maintain the first communication link with base station 105-*c* and the second communication link with base station 105-*d* (e.g., for a transition period before UE 115-*b* breaks the connection with the source base station).

At 320, UE 115-*b* may identify a time between a first transmission opportunity associated with a first base station (e.g., and a corresponding first cell) and a second transmission opportunity with a second base station (e.g., and a corresponding second cell). As described herein, the first base station may be either the target base station or the source base station, and the second base station may be either the source base station or the target base station. Based on the identified time, UE 115-*b* may determine that the first transmission opportunity and the second transmission opportunity conflict (e.g., in an overlapping scenario or a non-overlapping scenario). For example, the transmission opportunities may fully overlap, partially overlap, or be separated in time by less than a threshold time. This threshold time may correspond to an amount of time for the UE 115-*b* to switch from a first communication beam for communicating with the first base station in a first bandwidth to a second communication beam for communicating with the second base station in a second bandwidth.

Based on the conflicting transmission opportunities, UE 115-*b* may select to communicate in the first transmission opportunity with the first base station instead of monitoring the second transmission opportunity for a message from the second base station. In some examples, UE 115-*b* may select a default beam for either the source or target base station (e.g., based on prioritization rules) and may use the default beam for communication. As illustrated, UE 115-*b* may prioritize communications with the target base station (e.g., base station 105-*d*), and may receive, at 325, a first message from base station 105-*d* (e.g., based on selecting to communicate in the first transmission opportunity). However, based on this selection, UE 115-*b* may refrain from receiving a second message from the source base station (e.g., base station 105-*c*). For example, UE 115-*b* may drop a monitoring occasion from a search space associated with base station 105-*c* or may drop a scheduled downlink grant for base station 105-*c*. In some cases, based on dropping the second transmission opportunity at 330, UE 115-*b* may miss a packet (e.g., the second message) from base station 105-*c*.

However, UE 115-*b* may monitor a third transmission opportunity for the second message from base station 105-*c* based on performing the dual active link handover. For example, UE 115-*b* may be configured with additional opportunities to receive a packet from base station 105-*c* based on the UE 115-*b* operating in dual active link handover.

In a first example, base station 105-*c* may determine that UE 115-*b* missed the second message at 330 (e.g., based on a re-transmission timer at base station 105-*c*) and may re-transmit the second message at 335. In some cases, the base station 105-*c* may implement a shorter re-transmission timer when the UE 115-*b* is performing dual active link handover than when the UE 115-*b* is connected to just base station 105-*c* (e.g., due to a greater likelihood of the UE 115-*b* dropping packets). The base station 105-*c* may indicate this re-transmission timer for message re-transmission when the UE is performing dual active link handover to the UE 115-*b*, or the UE 115-*b* may select for the base station 105-*c* to implement the shorter timer.

In a second example, base station 105-*c* may perform slot aggregation with the UE 115-*b* is performing dual active link handover. For example, base station 105-*c* may reduce a search space periodicity, implement slot aggregation for data transmissions, or both during dual active link handover operations. In some cases, base station 105-*c* may configure UE 115-*b* with the slot aggregation configuration (e.g., using the handover command at 310 or another configuration message). The slot aggregation configuration may include a number of repetitions of the second message in a set of slots, a periodicity for the repetitions across slots, or both. Based on the slot aggregation configuration, base station 105-*c* may transmit the second message multiple times (e.g., in multiple transmission opportunities, such as consecutive slots) to UE 115-*b* and UE 115-*b* may receive the second message based on aggregating repetitions in non-dropped transmission opportunities. For example, based on the slot aggregation, even if UE 115-*b* missed the second message at 330 (e.g., based on dropping a monitoring occasion or packet reception), UE 115-*b* may receive the second message at 335. In some cases, UE 115-*b* may transmit a notification message to base station 105-*c* indicating which repetition(s) of the slot aggregated data (e.g., the second message transmitted using slot aggregation) are dropped at UE 115-*b*, how many repetitions are dropped, or both. Base station 105-*c* may determine whether to re-transmit the slot aggregated data based on the information about which repetitions are dropped, how many repetitions are dropped, or both at UE 115-*b*.

Although described herein with UE 115-*b* dropping packet reception from the source base station, it is to be understood that UE 115-*b* may alternatively drop packet reception from the target base station (e.g., based on prioritizing a communication with the source base station). Furthermore, while described herein regarding downlink transmissions (e.g., PDCCH messages, PDSCH messages, etc.), similar techniques may be implemented in uplink. For example, UE 115-*b* may drop downlink monitoring or reception based on prioritizing an uplink transmission (e.g., a PUCCH message, a PUSCH message, etc.) or may drop uplink transmission for one cell based on communications with a different cell. UE 115-*b* may implement slot aggregation, shortened re-transmission timers, or both in the uplink (e.g., in addition or alternative to a base station 105 implementing these techniques in the downlink).

Figure 4:
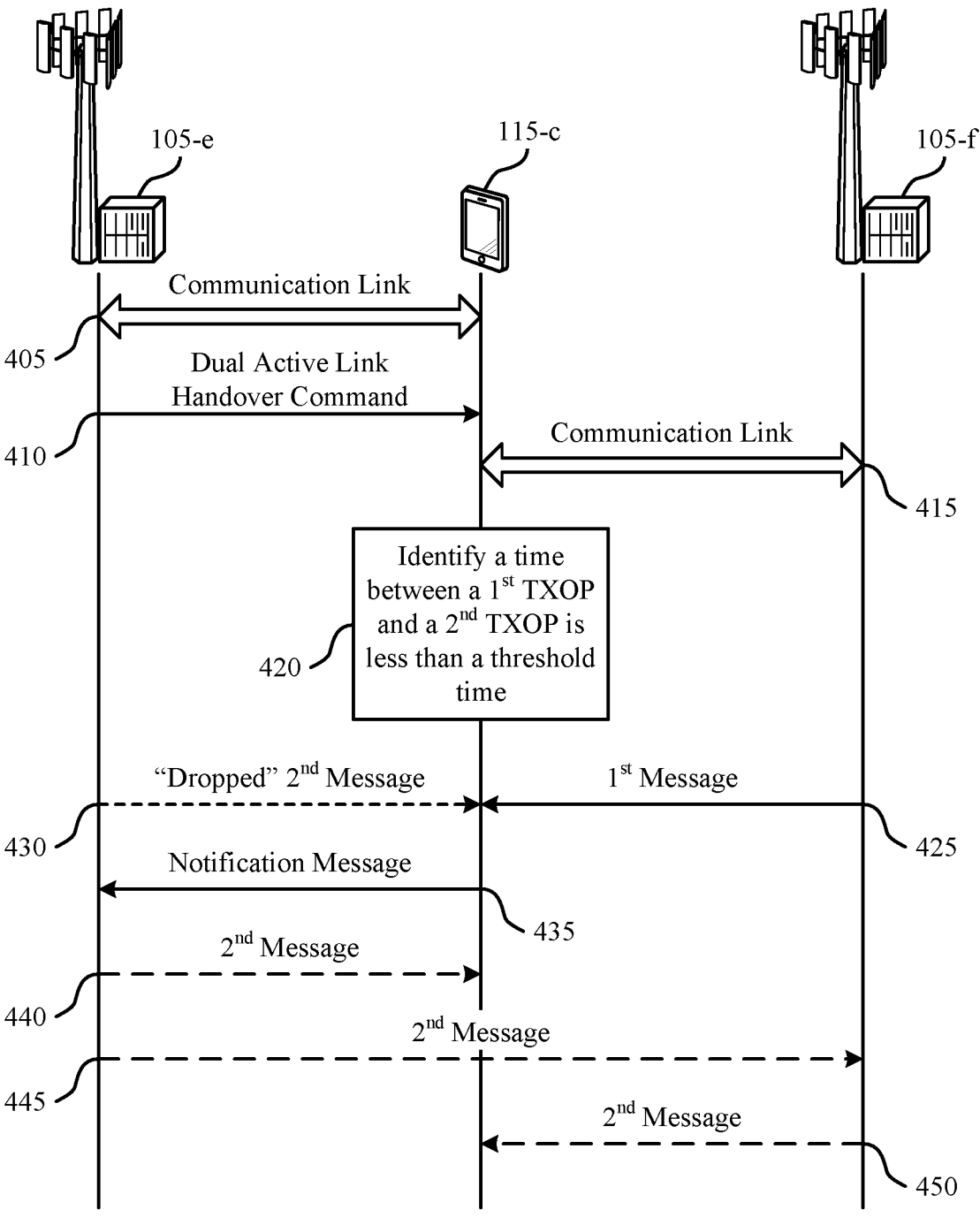

FIG. 4 illustrates an example of a process flow 400 that supports error handling in dual active link handover in accordance with aspects of the present disclosure. In some examples, the process flow 400 may implement aspects of wireless communications systems 100 or 200 as described with reference to FIGS. 1 and 2. The process flow 400 may include a UE 115-*c* and base stations 105-*e* and 105-*f*, which may be examples of the corresponding devices described with reference to FIGS. 1 through 3. As described with reference to FIG. 3, UE 115-*c* may perform a dual active link handover procedure to transition a connection from a source base station (e.g., base station 105-*f*) to a target base station (e.g., base station 105-*e*). UE 115-*c*, base station 105-*e*, base station 105-*f*, or a combination thereof may implement techniques to mitigate packet loss if UE 115-*c* drops a scheduled communication opportunity with one of the base stations 105. Alternative examples of the following may be implemented, where some steps are performed in a different order than described or are not performed at all. In some cases, steps may include additional features not mentioned below, or further steps may be added. For example, UEs 115, base stations 105, or both may implement steps from process flows 300 and 400 interchangeably. For example, a system may support both base station-triggered approaches and UE-assisted approaches to mitigate packet loss during dual active link handover.

As described with reference to FIG. 3, at 405, base station 105-*e* and UE 115-*c* may establish a first communication link. At 410, base station 105-*e* may transmit a handover command (e.g., a dual active link handover command) to UE 115-*c* indicating a handover of UE 115-*c* from the source base station (e.g., base station 105-*e*) to a target base station (e.g., base station 105-*g*). Based on the dual active link handover command, at 415, UE 115-*c* may establish a second communication link with base station 105-*f*. By performing dual active link operations, UE 115-*c* may concurrently maintain the first communication link with base station 105-*e* and the second communication link with base station 105-*f*.

At 420, UE 115-*c* may identify a time between a first transmission opportunity associated with a first base station (e.g., and a corresponding first cell) and a second transmission opportunity with a second base station (e.g., and a corresponding second cell). As described herein, the first base station may be either the target base station or the source base station, and the second base station may be either the source base station or the target base station. Based on the identified time, UE 115-*c* may determine that the first transmission opportunity and the second transmission opportunity conflict (e.g., as described in more detail with reference to FIG. 3).

Based on the conflicting transmission opportunities, UE 115-*c* may select to communicate in the first transmission opportunity with the first base station instead of monitoring the second transmission opportunity for a message from the second base station. In some examples, UE 115-*c* may select a default beam for either the source or target base station (e.g., based on prioritization rules) and may use the default beam for communication. As illustrated, UE 115-*c* may prioritize communications with the target base station (e.g., base station 105-*f*), and may receive, at 425, a first message from base station 105-*f* (e.g., based on selecting to communicate in the first transmission opportunity). However, based on this selection, UE 115-*c* may refrain from receiving a second message from the source base station (e.g., base station 105-*e*). For example, UE 115-*c* may drop a monitoring occasion from a search space associated with base station 105-*e* or may drop a scheduled downlink grant for base station 105-*e*. In some cases, based on dropping the second transmission opportunity at 430, UE 115-*c* may miss a packet (e.g., the second message) from base station 105-*e*.

At 435, UE 115-*c* may transmit, to base station 105-*e* (i.e., the base station 105 for which UE 115-*c* dropped the monitoring occasion or packet reception), a notification message indication that UE 115-*c* did not monitor the second transmission opportunity. If UE 115-*c* dropped a PDCCH candidate or an unscheduled PDSCH monitoring occasion, the notification message may indicate the particular dropped monitoring occasion. Base station 105-*e* may identify if the dropped monitoring occasion contained a message transmission (e.g., from base station 105-*e*) and may determine whether to re-transmit a message based on the identification.

If UE 115-*c* dropped a scheduled PDSCH transmission opportunity, the notification message may include a NACK for the scheduled PDSCH message. UE 115-*c* may transmit the notification message in a grant-free uplink resource or may piggy-back the notification message on a subsequent uplink transmission (e.g., a next scheduled uplink message, such as a scheduled PUCCH or PUSCH message).

If UE 115-*c* missed a packet from base station 105-*e* (e.g., based on prioritizing the transmission opportunity for base station 105-*f* at 425), base station 105-*e* may determine to re-transmit the packet. In some examples, base station 105-*e* may re-transmit the packet (e.g., a second message) to UE 115-*c* at 440 in a third transmission opportunity based on the notification message. In some other examples, base station 105-*e* may re-transmit the packet to base station 105-*f* at 445 (e.g., rather than or in addition to re-transmitting to UE 115-*c*). For example, base station 105-*e* may forward the packet (e.g., the second message) to base station 105-*f* over a wired backhaul, over a wireless backhaul link, via a network entity, or over any combination of these or other interfaces. At 450, base station 105-*f* may transmit the second message to UE 115-*c* in a third transmission opportunity. For example, if UE 115-*c* prioritizes communications with base station 105-*f*, this forwarding technique may improve the transmission reliability of the second message.

Although described herein with UE 115-*c* dropping packet reception from the source base station, it is to be understood that UE 115-*c* may alternatively drop packet reception from the target base station (e.g., based on prioritizing a communication with the source base station). Furthermore, while described herein regarding downlink transmissions, similar techniques may be implemented in uplink. For example, UE 115-*c* may drop downlink monitoring or reception based on prioritizing an uplink transmission or may drop uplink transmission for one cell based on communications with a different cell. UE 115-*c* may implement UE-assisted recovery for dropped uplink opportunities (e.g., in addition or alternative to implementing these techniques for dropped downlink opportunities).

Figure 5:
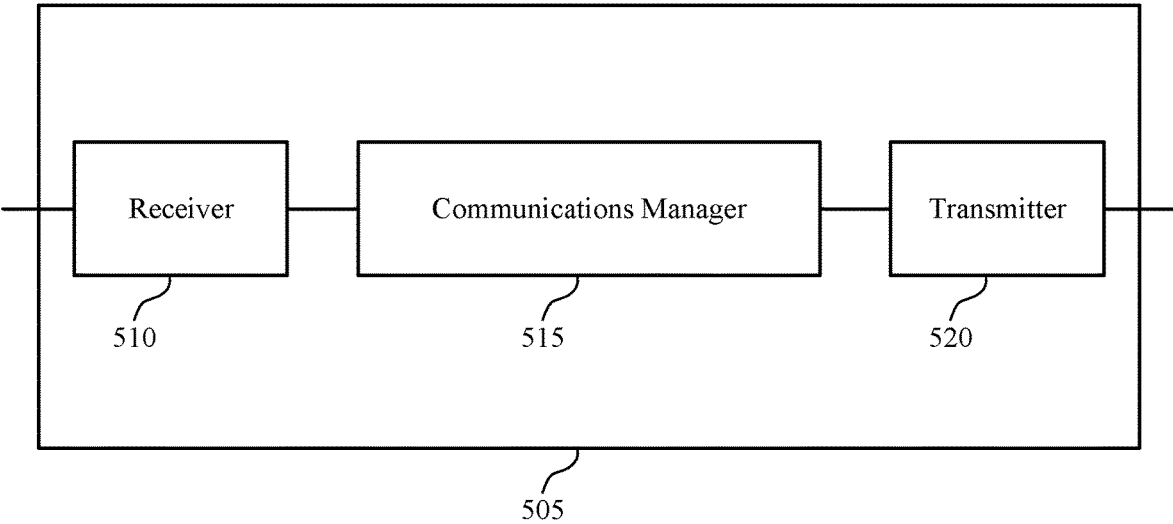
FIGS. 5 and 6 show diagrams of devices that support error handling in dual active link handover in accordance with aspects of the present disclosure.

FIG. 5 shows a diagram 500 of a device 505 that supports error handling in dual active link handover in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to message handling in dual active link handover, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may concurrently maintain a first communication link with a first base station and a second communication link with a second base station based on performing a dual active link handover, identify a time between a first transmission opportunity associated with the first base station and a second transmission opportunity associated with the second base station, and select to communicate in the first transmission opportunity with the first base station instead of monitoring the second transmission opportunity for a message from the second base station based on the identified time. In some cases, the communications manager 515 may monitor a third transmission opportunity for the message from the second base station based on performing the dual active link handover. Additionally or alternatively, the communications manager 515 may transmit, to the second base station, a notification message indicating that the UE did not monitor the second transmission opportunity.

The actions performed by the communications manager 515 as described herein may be implemented to realize one or more potential advantages. For example, monitoring additional opportunities for a message, transmitting a notification message indicating that the UE did not monitor a second transmission opportunity, or both may mitigate packet loss at the UE (e.g., the device 505). In some cases, configuring slot aggregation or a shorter re-transmission timer for packet re-transmission during dual active link handover operations may reduce the latency involved in the UE receiving a packet (e.g., from a non-prioritized base station). Additionally or alternatively, notifying a base station that the UE dropped a monitoring occasion may reduce the latency involved in the base station re-transmitting a packet initially transmitted in the dropped monitoring occasion.

The communications manager 515 may be an example of aspects of the communications manager 810 described herein. The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas, or any other analog components) coupled with the mobile device modem to enable wireless transmission and reception over one or more bands.

The communications manager 515 as described herein may be implemented to realize one or more potential advantages. One implementation may allow the device 505 to provide assistance for mitigating packet error rates, packet loss rates, or both during dual active link handover. Based on the techniques for dual active link handover, the device may support error handling in dual active link handover and, therefore, may potentially reduce the latency involved in receiving dropped packets.

As such, the device 505 may reduce the number of dropped packets or reduce the latency associated with receiving dropped packets during a dual active link handover and, accordingly, may communicate over the channel with a greater likelihood of successful communications. In some examples, based on a greater likelihood of successful communications, the device 505 may more efficiently power a processor or one or more processing units associated with a dual active link handover, which may enable the device to save power and increase batter life. For example, a processor of the device 505 (e.g., a processor controlling the receiver 510, the communications manager 515, the transmitter 520, or some combination thereof) may reduce processing resources used for re-transmissions. That is, using error handling for dual active link handover to improve transmission reliability may potentially reduce the number of re-transmissions performed in the system, allowing the UE 115 to reduce the number of times the processor ramps up processing power and turns on processing units to handle re-transmissions.

Figure 6:
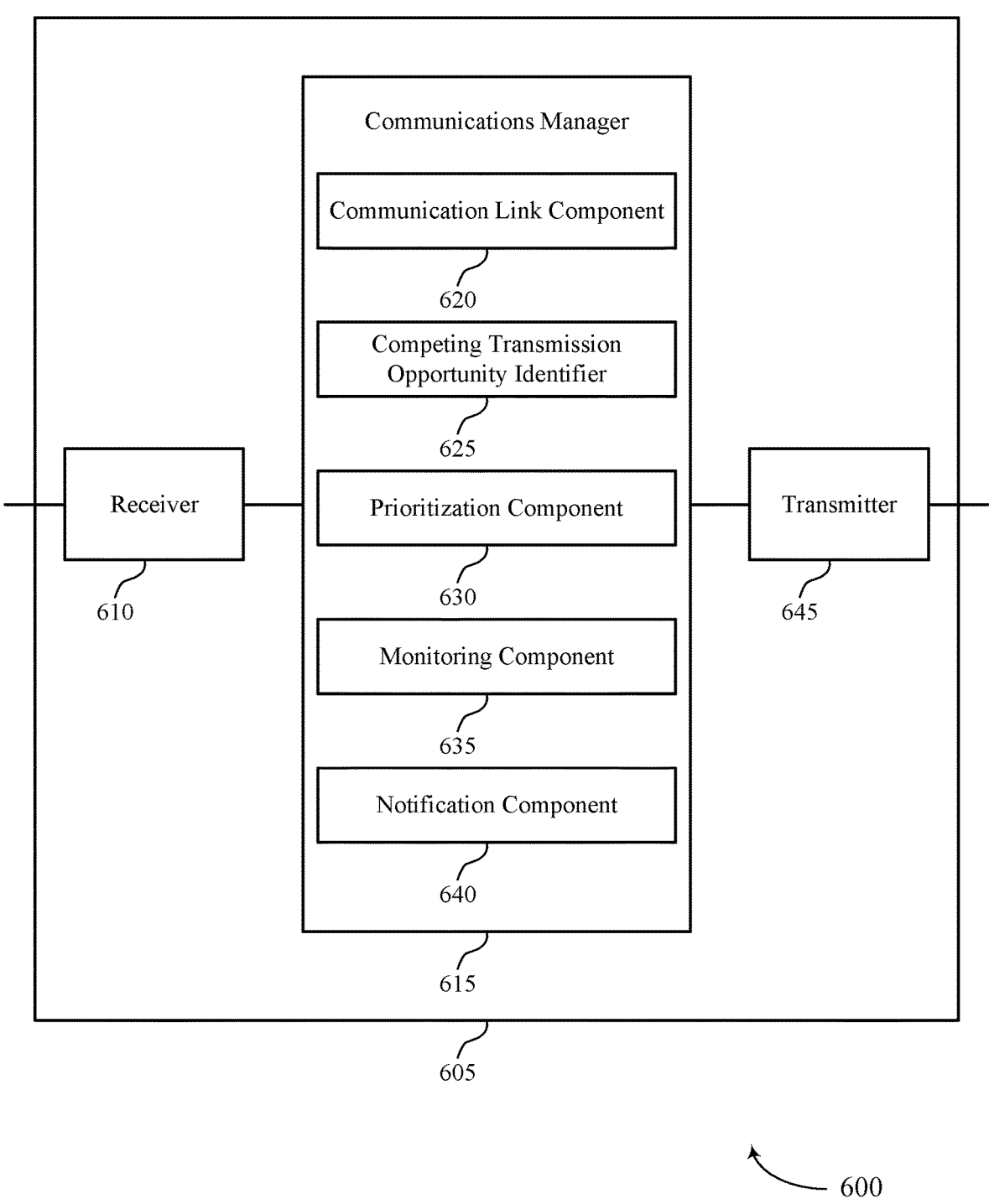

FIG. 6 shows a diagram 600 of a device 605 that supports error handling in dual active link handover in accordance with aspects of the present disclosure. The device 605 may be an example of aspects of a device 505 or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to message handling in dual active link handover, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a communication link component 620, a competing transmission opportunity identifier 625, a prioritization component 630, a monitoring component 635, a notification component 640, or a combination thereof. The communications manager 615 may be an example of aspects of the communications manager 810 described herein.

The communication link component 620 may concurrently maintain a first communication link with a first base station and a second communication link with a second base station based on performing a dual active link handover.

The competing transmission opportunity identifier 625 may identify a time between a first transmission opportunity associated with the first base station and a second transmission opportunity associated with the second base station. The prioritization component 630 may select to communicate in the first transmission opportunity with the first base station instead of monitoring the second transmission opportunity for a message from the second base station based on the identified time.

In a first example, the monitoring component 635 may monitor a third transmission opportunity for the message from the second base station based on performing the dual active link handover. In a second example, the notification component 640 may transmit, to the second base station, a notification message indicating that the UE did not monitor the second transmission opportunity.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
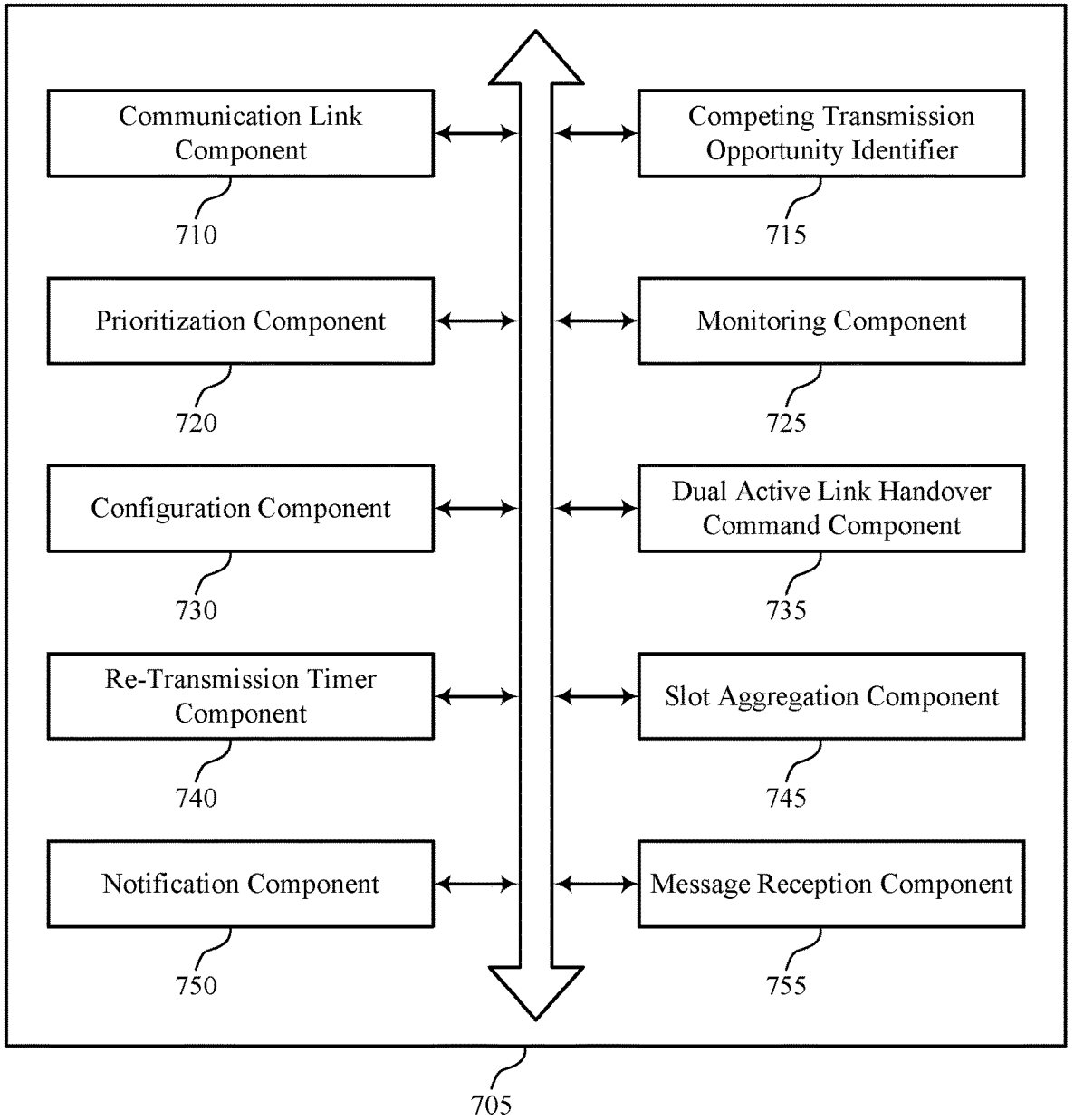
FIG. 7 shows a diagram of a communications manager that supports error handling in dual active link handover in accordance with aspects of the present disclosure.

FIG. 7 shows a diagram 700 of a communications manager 705 that supports error handling in dual active link handover in accordance with aspects of the present disclosure. The communications manager 705 may be an example of aspects of a communications manager 515, a communications manager 615, or a communications manager 810 described herein. The communications manager 705 may include a communication link component 710, a competing transmission opportunity identifier 715, a prioritization component 720, a monitoring component 725, a configuration component 730, a dual active link handover command component 735, a re-transmission timer component 740, a slot aggregation component 745, a notification component 750, a message reception component 755, or a combination thereof. Each of these modules may communicate, directly or indirectly, with one another (e.g., via one or more buses). The communications manager 705 may be implemented at a UE 115 for handling wireless communications.

In some cases, the communication link component 710 may concurrently maintain a first communication link with a first base station and a second communication link with a second base station based on performing a dual active link handover. The competing transmission opportunity identifier 715 may identify a time between a first transmission opportunity associated with the first base station and a second transmission opportunity associated with the second base station. The prioritization component 720 may select to communicate in the first transmission opportunity with the first base station instead of monitoring the second transmission opportunity for a message from the second base station based on the identified time. The monitoring component 725 may monitor a third transmission opportunity for the message from the second base station based on performing the dual active link handover.

In some examples, the competing transmission opportunity identifier 715 may select a first communication beam for communicating with the first base station in the first transmission opportunity and a first bandwidth, where the UE is configured to communicate using a single communication beam at a time. The competing transmission opportunity identifier 715 may determine that the identified time is less than a threshold time for switching from the first communication beam for communicating with the first base station in the first bandwidth to a second communication beam for communicating with the second base station in a second bandwidth, where the selecting to communicate in the first transmission opportunity instead of monitoring the second transmission opportunity is further based on the determining. In some cases, the first communication beam for communicating with the first base station in the first transmission opportunity and the first bandwidth is selected based on the first base station, the second base station, a first channel associated with the first transmission opportunity, a second channel associated with the second transmission opportunity, a first QoS associated with traffic for the first channel, a second QoS associated with traffic for the second channel, a first timing resource for the first transmission opportunity, a second timing resource for the second transmission opportunity, or a combination thereof.

In some cases, the threshold time for switching from the first communication beam for communicating with the first base station in the first bandwidth to the second communication beam for communicating with the second base station in the second bandwidth is greater than a threshold time for switching from the first communication beam for communicating with the first base station to a third communication beam for communicating with the first base station. In some cases, the first transmission opportunity and the second transmission opportunity at least partially overlap in time.

The configuration component 730 may identify a configuration associated with performing the dual active link handover and may determine a temporal relationship between the second transmission opportunity and the third transmission opportunity based on the configuration. A configuration associated with performing the dual active link handover may be a configuration for the UE to implement when the UE is performing dual active link handover that is different than a configuration that the UE implements when the UE is not performing dual active link handover. The dual active link handover command component 735 may receive the configuration from one or both of the first base station and the second base station. For example, the configuration component 730 may receive a configuration from the source base station for communicating with the source base station, a configuration from the target base station for communicating with the target base station, or both.

In some cases, the temporal relationship between the second transmission opportunity and the third transmission opportunity is based on a re-transmission timer for re-transmission of a message missed during the second transmission opportunity when the UE is performing the dual active link handover. The re-transmission timer component 740 may configure the re-transmission timer, where the re-transmission timer is shorter than a default re-transmission timer (e.g., used when the UE is not performing dual active link handover).

The slot aggregation component 745 may identify a slot aggregation configuration associated with performing the dual active link handover, where monitoring the third transmission opportunity for the message is based on the slot aggregation configuration. In some cases, the slot aggregation configuration includes one or both of a number of repetitions of the message in a set of slots and a periodicity for repetitions of the message in the set of slots.

In some examples, the configuration component 730 may select a configuration for one or both of the first communication link with the first base station and the second communication link with the second base station and may transmit, to one or both of the first base station and the second base station, an indication of the selected configuration, where monitoring the third transmission opportunity for the message is based on the selected configuration.

In some examples, the notification component 750 may transmit a notification message indicating that the UE did not monitor the second transmission opportunity, where monitoring the third transmission opportunity is further based on transmitting the notification message.

Additionally or alternatively, the communication link component 710 may concurrently maintain a first communication link with a first base station and a second communication link with a second base station based on performing a dual active link handover. The competing transmission opportunity identifier 715 may identify a time between a first transmission opportunity associated with the first base station and a second transmission opportunity associated with the second base station. The prioritization component 720 may select to communicate in the first transmission opportunity with the first base station instead of monitoring the second transmission opportunity for a first message from the second base station based on the identified time. In some cases, the second transmission opportunity corresponds to a monitoring occasion for a control channel message or a downlink grant for a data channel message. The notification component 750 may transmit, to the second base station, a notification message indicating that the UE did not monitor the second transmission opportunity.

In some examples, transmitting the notification message may involve transmitting a scheduled uplink message to the second base station, where the scheduled uplink message includes the notification message. In some other examples, transmitting the notification message may involve transmitting the notification message in a grant-free uplink resource. In some cases, the notification message further indicates one or both of a search space schedule for the first base station and a periodic data transmission schedule for the first base station. In some cases, the notification message indicates a type of channel associated with the second transmission opportunity, a search configuration for the second transmission opportunity, a timing occasion for the second transmission opportunity, or a combination thereof.

The message reception component 755 may receive, from one or both of the first base station and the second base station, the first message in a third transmission opportunity based on the notification message.

The configuration component 730 may receive, from the second base station, a configuration associated with performing the dual active link handover, where the configuration is received based on the notification message. In some cases, the configuration may include one or both of a re-transmission timer for re-transmission of the first message missed during the second transmission opportunity when the UE is performing the dual active link handover indicating a temporal relationship between the second transmission opportunity and the third transmission opportunity and a slot aggregation configuration including one or both of a number of repetitions of the first message in a set of slots and a periodicity for repetitions of the first message in the set of slots.

In some examples, the slot aggregation component 745 may receive a slot aggregation configuration associated with performing the dual active link handover, where the slot aggregation configuration indicates a number of repetitions of the first message in a set of slots and the notification message includes an indication of one or both of which repetitions are missed and how many repetitions are missed.

In some examples, the competing transmission opportunity identifier 715 may select a first communication beam for communicating with the first base station in the first transmission opportunity and a first bandwidth, where the UE is configured to communicate using a single communication beam at a time. The competing transmission opportunity identifier 715 may determine that the identified time is less than a threshold time for switching from the first communication beam for communicating with the first base station in the first bandwidth to a second communication beam for communicating with the second base station in a second bandwidth, where the selecting to communicate in the first transmission opportunity instead of monitoring the second transmission opportunity is further based on the determining. In some cases, the first communication beam for communicating with the first base station in the first transmission opportunity and the first bandwidth is selected based on the first base station, the second base station, a first channel associated with the first transmission opportunity, a second channel associated with the second transmission opportunity, a first quality of service associated with traffic for the first channel, a second quality of service associated with traffic for the second channel, a first timing resource for the first transmission opportunity, a second timing resource for the second transmission opportunity, or a combination thereof.

In some cases, the threshold time for switching from the first communication beam for communicating with the first base station in the first bandwidth to the second communication beam for communicating with the second base station in the second bandwidth is greater than a threshold time for switching from the first communication beam for communicating with the first base station to a third communication beam for communicating with the first base station. In some cases, the first transmission opportunity and the second transmission opportunity at least partially overlap in time.

Figure 8:
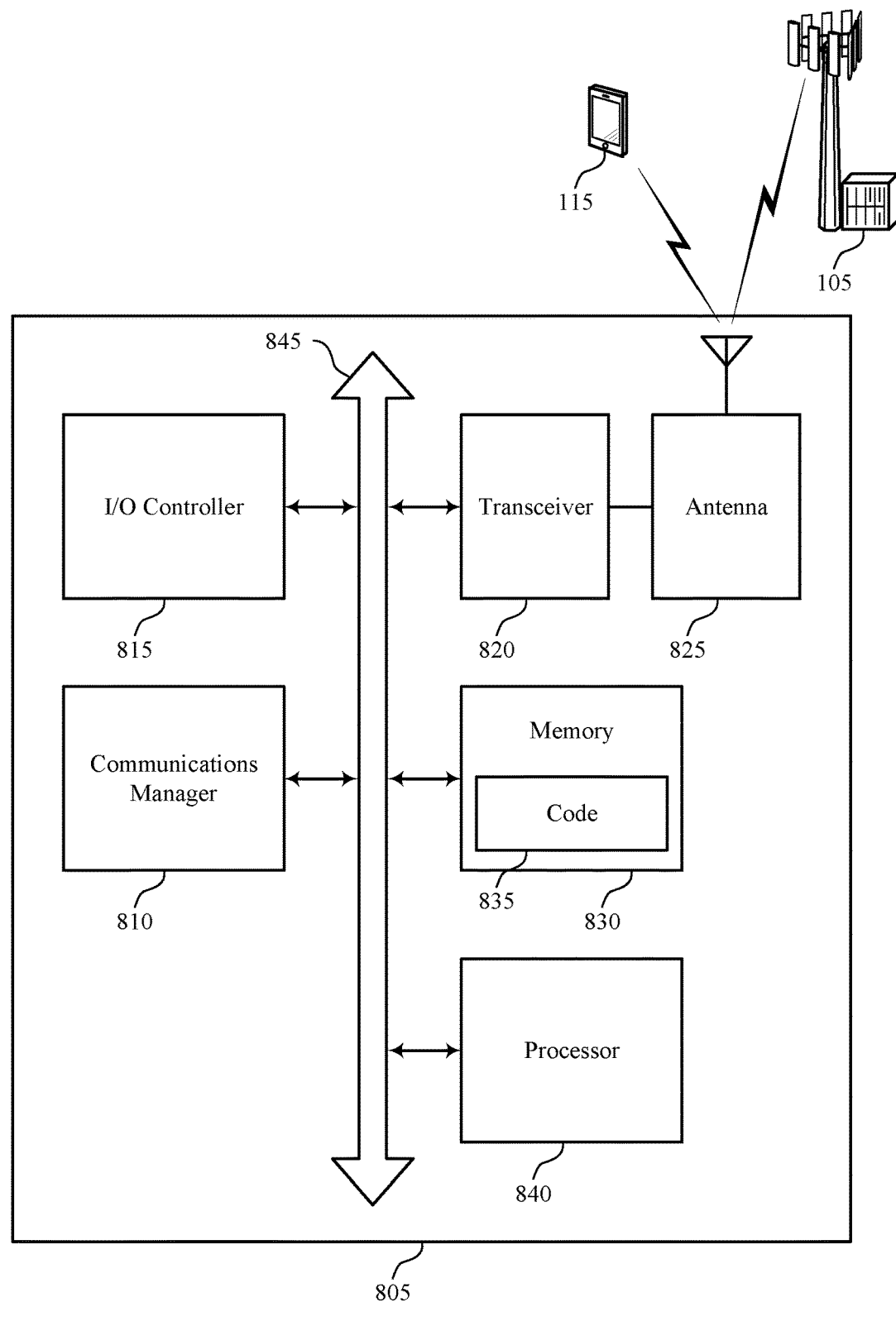
FIG. 8 shows a diagram of a system including a device that supports error handling in dual active link handover in accordance with aspects of the present disclosure.

FIG. 8 shows a diagram of a system 800 including a device 805 that supports error handling in dual active link handover in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some cases, the communications manager 810 may concurrently maintain a first communication link with a first base station and a second communication link with a second base station based on performing a dual active link handover, identify a time between a first transmission opportunity associated with the first base station and a second transmission opportunity associated with the second base station, select to communicate in the first transmission opportunity with the first base station instead of monitoring the second transmission opportunity for a message from the second base station based on the identified time, and monitor a third transmission opportunity for the message from the second base station based on performing the dual active link handover. Additionally or alternatively, the communications manager 810 may concurrently maintain a first communication link with a first base station and a second communication link with a second base station based on performing a dual active link handover, identify a time between a first transmission opportunity associated with the first base station and a second transmission opportunity associated with the second base station, select to communicate in the first transmission opportunity with the first base station instead of monitoring the second transmission opportunity for a first message from the second base station based on the identified time, and transmit, to the second base station, a notification message indicating that the UE (e.g., device 805) did not monitor the second transmission opportunity.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting message handling in dual active link handover).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
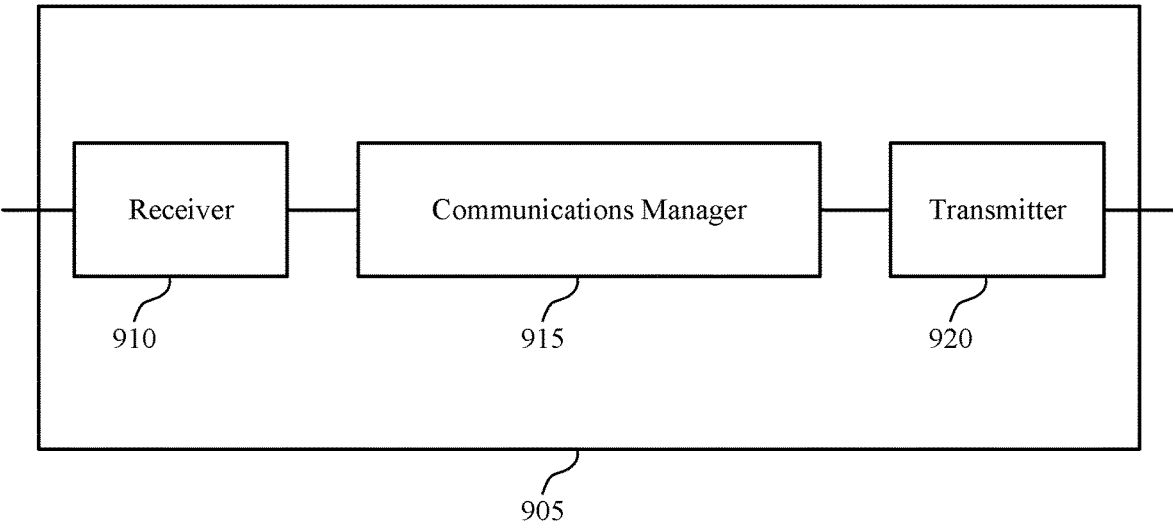
FIGS. 9 and 10 show diagrams of devices that support error handling in dual active link handover in accordance with aspects of the present disclosure.

FIG. 9 shows a diagram 900 of a device 905 that supports error handling in dual active link handover in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to message handling in dual active link handover, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may support wireless communications at a first base station. In some cases, the communications manager 915 may identify that a UE is performing a dual active link handover, where the UE concurrently maintains a first communication link with the first base station and a second communication link with a second base station while performing the dual active link handover, transmit a message to the UE in a first transmission opportunity, and transmit the message to the UE in a second transmission opportunity subsequent to the first transmission opportunity based on the UE performing the dual active link handover. Additionally or alternatively, the communications manager 915 may identify that a UE is performing a dual active link handover, where the UE concurrently maintains a first communication link with the first base station and a second communication link with a second base station while performing the dual active link handover, receive a notification message from the UE indicating that the UE did not monitor a first transmission opportunity based on performing the dual active link handover, and determine whether to re-transmit a message to one or both of the UE and the second base station based on the notification message.

The actions performed by the communications manager 915 as described herein may be implemented to realize one or more potential advantages. For example, transmitting the message to the UE in a second transmission opportunity subsequent to the first transmission opportunity based on the UE performing the dual active link handover, receiving a notification message from the UE indicating that the UE did not monitor a first transmission opportunity based on performing the dual active link handover, or both may mitigate packet loss at the UE. In some cases, configuring slot aggregation or a shorter re-transmission timer for packet re-transmission during dual active link handover operations may reduce the latency involved in transmitting a packet to the UE (e.g., from a non-prioritized base station). Additionally or alternatively, receiving the notification that the UE dropped a monitoring occasion may reduce the latency involved in re-transmitting a packet initially transmitted in the dropped monitoring occasion. Accordingly, the techniques described herein may improve transmission reliability and latency when a UE is connected to multiple base stations during dual active link handover.

The communications manager 915 may be an example of aspects of the communications manager 1210 described herein. The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
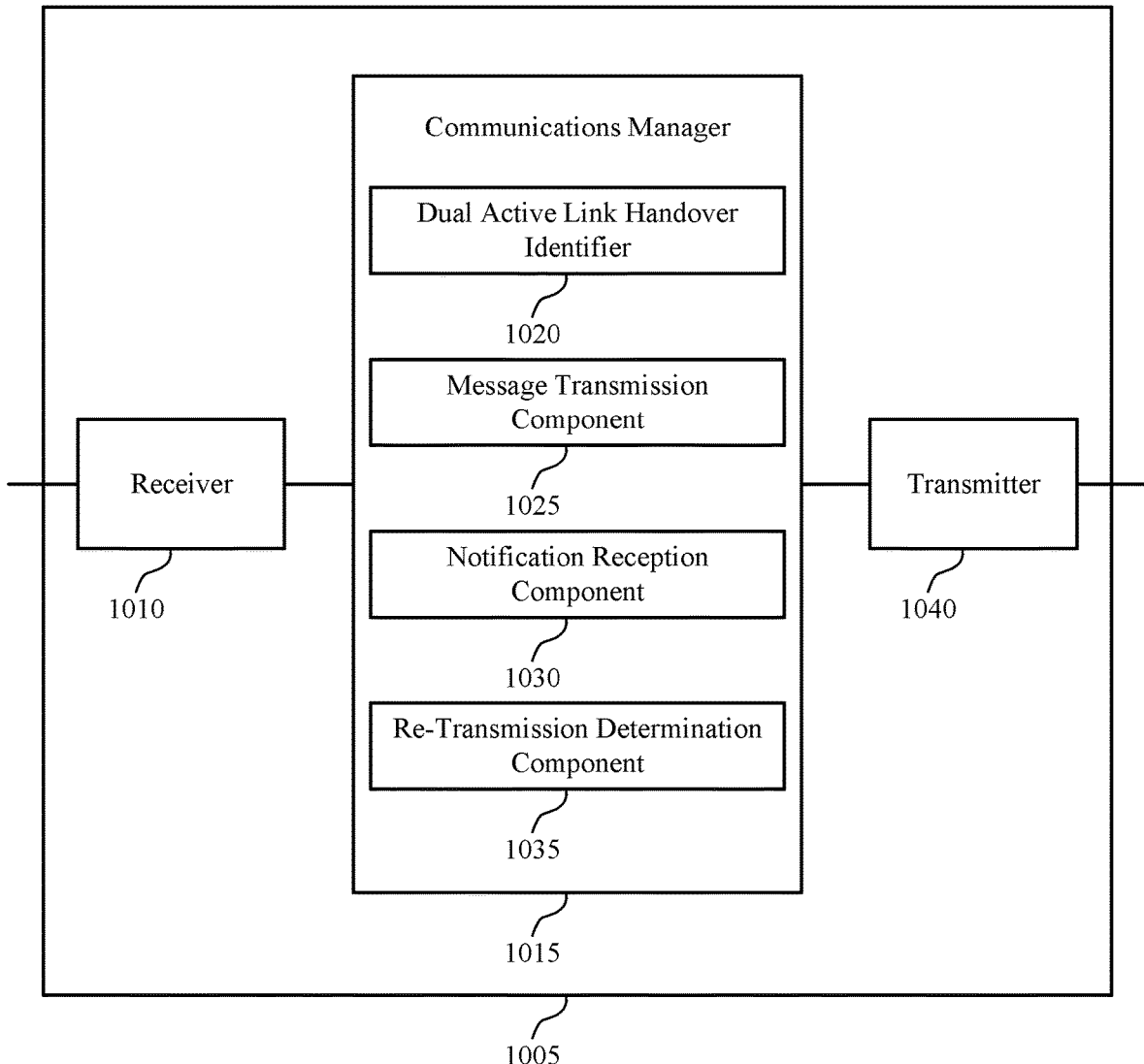

FIG. 10 shows a diagram 1000 of a device 1005 that supports error handling in dual active link handover in accordance with aspects of the present disclosure. The device 1005 may be an example of aspects of a device 905 or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to message handling in dual active link handover, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a dual active link handover identifier 1020, a message transmission component 1025, a notification reception component 1030, a re-transmission determination component 1035, or a combination thereof. The communications manager 1015 may be an example of aspects of the communications manager 1210 described herein. The communications manager 1015 may implement wireless communications at a first base station.

In some cases, the dual active link handover identifier 1020 may identify that a UE is performing a dual active link handover, where the UE concurrently maintains a first communication link with the first base station and a second communication link with a second base station while performing the dual active link handover. The message transmission component 1025 may transmit a message to the UE in a first transmission opportunity and may transmit the message to the UE in a second transmission opportunity subsequent to the first transmission opportunity based on the UE performing the dual active link handover.

The dual active link handover identifier 1020 may identify that a UE is performing a dual active link handover, where the UE concurrently maintains a first communication link with the first base station and a second communication link with a second base station while performing the dual active link handover. The notification reception component 1030 may receive a notification message from the UE indicating that the UE did not monitor a first transmission opportunity based on performing the dual active link handover. The re-transmission determination component 1035 may determine whether to re-transmit a message to one or both of the UE and the second base station based on the notification message.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
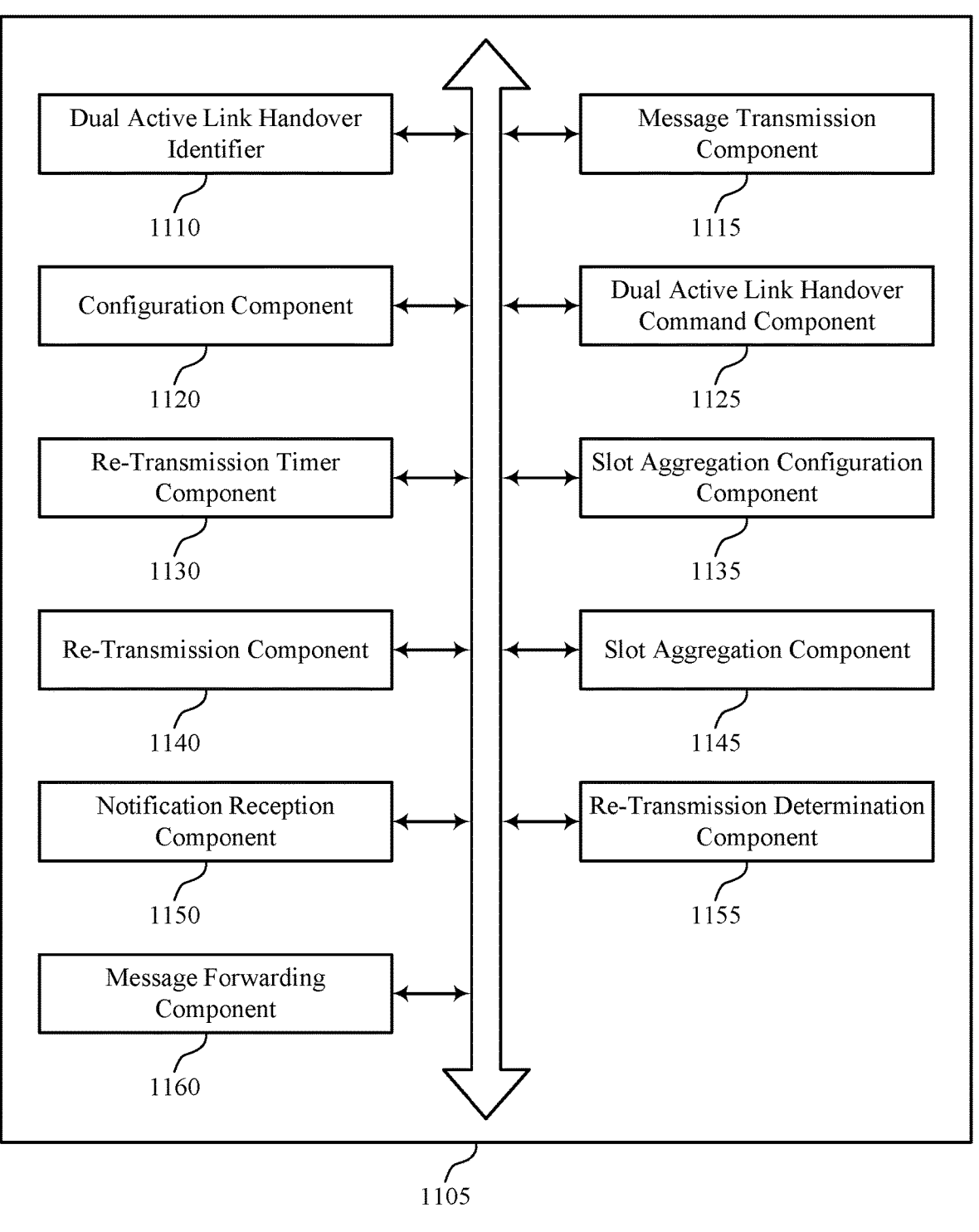
FIG. 11 shows a diagram of a communications manager that supports error handling in dual active link handover in accordance with aspects of the present disclosure.

FIG. 11 shows a diagram 1100 of a communications manager 1105 that supports error handling in dual active link handover in accordance with aspects of the present disclosure. The communications manager 1105 may be an example of aspects of a communications manager 915, a communications manager 1015, or a communications manager 1210 described herein. The communications manager 1105 may include a dual active link handover identifier 1110, a message transmission component 1115, a configuration component 1120, a dual active link handover command component 1125, a re-transmission timer component 1130, a slot aggregation configuration component 1135, a re-transmission component 1140, a slot aggregation component 1145, a notification reception component 1150, a re-transmission determination component 1155, a message forwarding component 1160, or a combination thereof. Each of these modules may communicate, directly or indirectly, with one another (e.g., via one or more buses). The communications manager 1105 may be implemented at a first base station for handling wireless communications.

In some cases, the dual active link handover identifier 1110 may identify that a UE is performing a dual active link handover, where the UE concurrently maintains a first communication link with the first base station and a second communication link with a second base station while performing the dual active link handover. In some cases, the first base station includes a source base station of the dual active link handover or a target base station of the dual active link handover. The message transmission component 1115 may transmit a message to the UE in a first transmission opportunity. Additionally, the message transmission component 1115 may transmit the message to the UE in a second transmission opportunity subsequent to the first transmission opportunity based on the UE performing the dual active link handover.

The configuration component 1120 may configure the UE with a configuration associated with the UE performing the dual active link handover, where the configuration indicates a temporal relationship between the first transmission opportunity and the second transmission opportunity. For example, the UE may implement the configuration when the UE is performing dual active link handover and may otherwise implement a different configuration. The dual active link handover command component 1125 may transmit a configuration message, a dual active link handover command, or both to the UE indicating the configuration.

In some cases, the temporal relationship between the first transmission opportunity and the second transmission opportunity includes a re-transmission timer for re-transmission of a message missed during the first transmission opportunity when the UE is performing the dual active link handover. The re-transmission timer component 1130 may configure the re-transmission timer for re-transmission, where the re-transmission timer is shorter than a default re-transmission timer.

The slot aggregation configuration component 1135 may configure the UE with a slot aggregation configuration associated with the UE performing the dual active link handover, where transmitting the message in the first transmission opportunity and in the second transmission opportunity is based on the slot aggregation configuration. In some examples, the dual active link handover command component 1125 may transmit a configuration message, a dual active link handover command, or both to the UE indicating the slot aggregation configuration, where the slot aggregation configuration includes one or both of a number of repetitions of the message in a set of slots and a periodicity for repetitions of the message in the set of slots.

The re-transmission component 1140 may determine that the UE did not receive the message in the first transmission opportunity, where transmitting the message in the second transmission opportunity includes re-transmitting the message in the second transmission opportunity based on the determining. In some examples, the re-transmission component 1140 may receive, from the UE, a notification message indicating that the UE did not monitor the first transmission opportunity, where the determining is based on the notification message.

The slot aggregation component 1145 may perform slot aggregation, where the message is transmitted in the first transmission opportunity and the second transmission opportunity based on the slot aggregation.

Additionally or alternatively, the dual active link handover identifier 1110 may identify that a UE is performing a dual active link handover, where the UE concurrently maintains a first communication link with the first base station and a second communication link with a second base station while performing the dual active link handover. In some cases, the first base station includes a source base station of the dual active link handover or a target base station of the dual active link handover. The notification reception component 1150 may receive a notification message from the UE indicating that the UE did not monitor a first transmission opportunity based on performing the dual active link handover. In some cases, the first transmission opportunity corresponds to a monitoring occasion for a control channel message or a downlink grant for a data channel message. The re-transmission determination component 1155 may determine whether to re-transmit a message to one or both of the UE and the second base station based on the notification message.

In some examples, the notification reception component 1150 may identify that the first transmission opportunity is unused. In some examples, receiving the notification message involves receiving a scheduled uplink message from the UE, where the scheduled uplink message includes the notification message. In some other examples, receiving the notification message involves receiving the notification message in a grant-free uplink resource. In some cases, the notification message indicates a type of channel associated with the first transmission opportunity, a search configuration for the first transmission opportunity, a timing occasion for the first transmission opportunity, or a combination thereof.

In some examples, the message transmission component 1115 may transmit the message to the UE in the first transmission opportunity and may re-transmit the message to the UE in a second transmission opportunity based on the determining.

In some examples, the configuration component 1120 may transmit, to the UE, a configuration associated with the UE performing the dual active link handover based on the notification message, where re-transmitting the message in the second transmission opportunity is based on the configuration. In some cases, the configuration includes one or both of a re-transmission timer for re-transmission of a message missed during the first transmission opportunity when the UE is performing the dual active link handover indicating a temporal relationship between the first transmission opportunity and the second transmission opportunity and a slot aggregation configuration including one or both of a number of repetitions of the message in a set of slots and a periodicity for repetitions of the message in the set of slots.

In some cases, the notification message further indicates one or both of a search space schedule for the second base station and a periodic data transmission schedule for the second base station, where the second transmission opportunity is based on one or both of the search space schedule for the second base station and the periodic data transmission schedule.

In some cases, the slot aggregation configuration component 1135 may transmit, to the UE, a slot aggregation configuration associated with the UE performing the dual active link handover, where the slot aggregation configuration indicates a number of repetitions of the message in a set of slots and the notification message includes an indication of one or both of which repetitions are missed and how many repetitions are missed by the UE.

In some examples, the message transmission component 1115 may transmit the message to the UE in the first transmission opportunity, and the message forwarding component 1160 may forward the message to the second base station based on the notification message.

Figure 12:
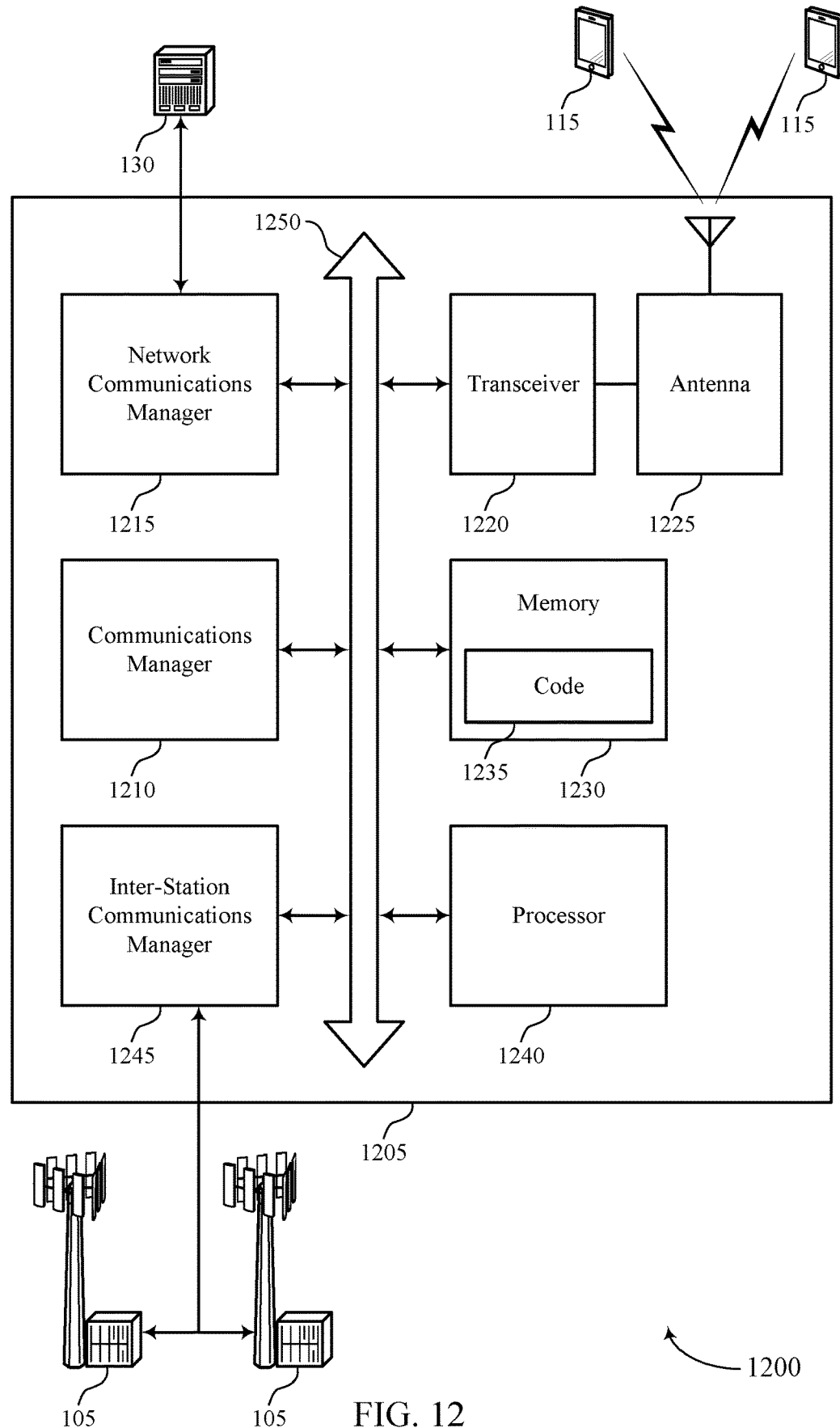
FIG. 12 shows a diagram of a system including a device that supports error handling in dual active link handover in accordance with aspects of the present disclosure.

FIG. 12 shows a diagram of a system 1200 including a device 1205 that supports error handling in dual active link handover in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may be implemented at a first base station. In some cases, the communications manager 1210 may identify that a UE is performing a dual active link handover, where the UE concurrently maintains a first communication link with the first base station and a second communication link with a second base station while performing the dual active link handover, transmit a message to the UE in a first transmission opportunity, and transmit the message to the UE in a second transmission opportunity subsequent to the first transmission opportunity based on the UE performing the dual active link handover. Additionally or alternatively, the communications manager 1210 may identify that a UE is performing a dual active link handover, where the UE concurrently maintains a first communication link with the first base station and a second communication link with a second base station while performing the dual active link handover, receive a notification message from the UE indicating that the UE did not monitor a first transmission opportunity based on performing the dual active link handover, and determine whether to re-transmit a message to one or both of the UE and the second base station based on the notification message.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting message handling in dual active link handover).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports error handling in dual active link handover in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may concurrently maintain a first communication link with a first base station and a second communication link with a second base station based on performing a dual active link handover. For example, the UE may have an existed connection with a source base station and may establish a connection with a target base station during the dual active link handover process. The operations of 1305 may be performed according to the methods described herein. In some examples, aspects of the operations of 1305 may be performed by a communication link component as described with reference to FIGS. 5 through 8.

At 1310, the UE may identify a time between a first transmission opportunity associated with the first base station and a second transmission opportunity associated with the second base station. The operations of 1310 may be performed according to the methods described herein. In some examples, aspects of the operations of 1310 may be performed by a competing transmission opportunity identifier as described with reference to FIGS. 5 through 8.

At 1315, the UE may select to communicate in the first transmission opportunity with the first base station instead of monitoring the second transmission opportunity for a message from the second base station based on the identified time. For example, the identified time may not be long enough for the UE to switch beams, bandwidths, cells, etc. in order to communicate with both of the base stations in the first and second transmission opportunities. For example, the first transmission opportunity may partially or fully overlap with the second transmission opportunity, or the two transmission opportunities may be relatively close in time (e.g., within a threshold time difference). The operations of 1315 may be performed according to the methods described herein. In some examples, aspects of the operations of 1315 may be performed by a prioritization component as described with reference to FIGS. 5 through 8.

At 1320, the UE may monitor a third transmission opportunity for the message from the second base station based on performing the dual active link handover. For example, the base station may re-transmit the message or may transmit multiple repetitions of the message in a slot aggregation procedure. The UE may monitor for the re-transmission or for one or more repetitions to receive the message (e.g., even if the UE refrained from receiving the message in the second transmission opportunity). The operations of 1320 may be performed according to the methods described herein. In some examples, aspects of the operations of 1320 may be performed by a monitoring component as described with reference to FIGS. 5 through 8.

FIG. 14 shows a flowchart illustrating a method 1400 that supports error handling in dual active link handover in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station (e.g., a first base station) may identify that a UE is performing a dual active link handover, where the UE concurrently maintains a first communication link with the first base station and a second communication link with a second base station while performing the dual active link handover. For example, if the base station is the source base station in the dual active link handover, the base station may identify that the UE is performing the dual active link handover based on sending a handover command to the UE. If the base station is the target base station in the dual active link handover, the base station may receive an indication from the source base station or the UE indicating that the UE is performing the dual active link handover. The operations of 1405 may be performed according to the methods described herein. In some examples, aspects of the operations of 1405 may be performed by a dual active link handover identifier as described with reference to FIGS. 9 through 12.

At 1410, the base station may transmit a message to the UE in a first transmission opportunity. The operations of 1410 may be performed according to the methods described herein. In some examples, aspects of the operations of 1410 may be performed by a message transmission component as described with reference to FIGS. 9 through 12.

At 1415, the base station may transmit the message to the UE in a second transmission opportunity subsequent to the first transmission opportunity based on the UE performing the dual active link handover. For example, the base station may transmit a re-transmission of the message (e.g., if the UE dropped the transmission of the message at 1410) or may transmit multiple repetitions of the message in a slot aggregation procedure. The operations of 1415 may be performed according to the methods described herein. In some examples, aspects of the operations of 1415 may be performed by a message transmission component as described with reference to FIGS. 9 through 12.

FIG. 15 shows a flowchart illustrating a method 1500 that supports error handling in dual active link handover in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may concurrently maintain a first communication link with a first base station and a second communication link with a second base station based on performing a dual active link handover. The operations of 1505 may be performed according to the methods described herein. In some examples, aspects of the operations of 1505 may be performed by a communication link component as described with reference to FIGS. 5 through 8.

At 1510, the UE may identify a time between a first transmission opportunity associated with the first base station and a second transmission opportunity associated with the second base station. The operations of 1510 may be performed according to the methods described herein. In some examples, aspects of the operations of 1510 may be performed by a competing transmission opportunity identifier as described with reference to FIGS. 5 through 8.

At 1515, the UE may select to communicate in the first transmission opportunity with the first base station instead of monitoring the second transmission opportunity for a first message from the second base station based on the identified time. For example, the first transmission opportunity and the second transmission opportunity may be competing opportunities (e.g., overlapping or non-overlapping competing opportunities). The operations of 1515 may be performed according to the methods described herein. In some examples, aspects of the operations of 1515 may be performed by a prioritization component as described with reference to FIGS. 5 through 8.

At 1520, the UE may transmit, to the second base station, a notification message indicating that the UE did not monitor the second transmission opportunity. The operations of 1520 may be performed according to the methods described herein. In some examples, aspects of the operations of 1520 may be performed by a notification component as described with reference to FIGS. 5 through 8.

FIG. 16 shows a flowchart illustrating a method 1600 that supports error handling in dual active link handover in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station (e.g., a first base station) may identify that a UE is performing a dual active link handover, where the UE concurrently maintains a first communication link with the first base station and a second communication link with a second base station while performing the dual active link handover. The operations of 1605 may be performed according to the methods described herein. In some examples, aspects of the operations of 1605 may be performed by a dual active link handover identifier as described with reference to FIGS. 9 through 12.

At 1610, the base station may receive a notification message from the UE indicating that the UE did not monitor a first transmission opportunity based on performing the dual active link handover. The operations of 1610 may be performed according to the methods described herein. In some examples, aspects of the operations of 1610 may be performed by a notification reception component as described with reference to FIGS. 9 through 12.

At 1615, the base station may determine whether to re-transmit a message to one or both of the UE and the second base station based on the notification message. For example, if the base station did not transmit a message in the dropped first transmission opportunity, the base station may not re-transmit a message. If the base station transmitted a message in the dropped first transmission opportunity, the base station may re-transmit the message to the UE or may forward the message to the second base station, and the second base station may transmit the message to the UE (e.g., based on the UE prioritizing transmissions from the second base station). The operations of 1615 may be performed according to the methods described herein. In some examples, aspects of the operations of 1615 may be performed by a re-transmission determination component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first network device, comprising:
    transmitting a configuration message or a dual active link handover command to a user equipment (UE) indicating a configuration associated with the UE performing a dual active link handover, wherein the configuration indicates a temporal relationship between a first transmission opportunity and a second transmission opportunity subsequent to the first transmission opportunity, the temporal relationship comprising a re-transmission timer;
    identifying that the UE is performing the dual active link handover, wherein the UE concurrently maintains a first communication link with the first network device and a second communication link with a second network device while performing the dual active link handover;
    transmitting a message to the UE in the first transmission opportunity, wherein the first network device activates the re-transmission timer after transmitting the message; and
    transmitting, based at least in part on an expiration of the re-transmission timer, the message to the UE in the second transmission opportunity subsequent to the first transmission opportunity based at least in part on the UE performing the dual active link handover and based at least in part on the temporal relationship between the first transmission opportunity and the second transmission opportunity indicated by the configuration.

2. The method of claim 1, wherein the re-transmission timer for re-transmission of the message missed during the first transmission opportunity is shorter than a default re-transmission timer.

3. The method of claim 1, further comprising:
    configuring the UE with a slot aggregation configuration associated with the UE performing the dual active link handover, wherein transmitting the message in the first transmission opportunity and in the second transmission opportunity is based at least in part on the slot aggregation configuration.

4. The method of claim 3, wherein:
    the configuration message or the dual active link handover command indicates the slot aggregation configuration, wherein the slot aggregation configuration comprises one or both of a number of repetitions of the message in a plurality of slots and a periodicity for repetitions of the message in the plurality of slots.

5. The method of claim 1, further comprising:
    determining that the UE did not receive the message in the first transmission opportunity, wherein transmitting the message in the second transmission opportunity comprises re-transmitting the message in the second transmission opportunity based at least in part on the determining.

6. The method of claim 5, further comprising:
receiving, from the UE, a notification message indicating that the UE did not monitor the first transmission opportunity, wherein the determining is based at least in part on the notification message.

7. The method of claim 1, further comprising:
performing slot aggregation, wherein the message is transmitted in the first transmission opportunity and the second transmission opportunity based at least in part on the slot aggregation.

8. The method of claim 1, wherein the first network device comprises a source network device of the dual active link handover or a target network device of the dual active link handover.

9. An apparatus for wireless communications at a first network device, comprising:
one or more processors; and
one or more memories coupled with the one or more processors, wherein the one or more memories comprise instructions executable by the one or more processors to cause the apparatus to:
transmit a configuration message or a dual active link handover command to a user equipment (UE) indicating a configuration associated with the UE performing a dual active link handover, wherein the configuration indicates a temporal relationship between a first transmission opportunity and a second transmission opportunity subsequent to the first transmission opportunity, the temporal relationship comprising a re-transmission timer;
identify that the UE is performing the dual active link handover, wherein the UE concurrently maintains a first communication link with the first network device and a second communication link with a second network device while performing the dual active link handover;
transmit a message to the UE in the first transmission opportunity, wherein the first network device activates the re-transmission timer after transmitting the message; and
transmit, based at least in part on an expiration of the re-transmission timer, the message to the UE in the second transmission opportunity subsequent to the first transmission opportunity based at least in part on the UE performing the dual active link handover and based at least in part on the temporal relationship between the first transmission opportunity and the second transmission opportunity indicated by the configuration.

10. The apparatus of claim 9, wherein the instructions are further executable by the one or more processors to cause the apparatus to:
configure the UE with a slot aggregation configuration associated with the UE performing the dual active link handover, wherein the instructions executable by the one or more processors to cause the apparatus to transmit the message in the first transmission opportunity and in the second transmission opportunity are further executable by the one or more processors to cause the apparatus to transmit the message based at least in part on the slot aggregation configuration.

11. The apparatus of claim 10, wherein:
the configuration message or the dual active link handover command to the UE indicating the slot aggregation configuration, wherein the slot aggregation configuration comprises one or both of a number of repetitions of the message in a plurality of slots and a periodicity for repetitions of the message in the plurality of slots.

12. The apparatus of claim 9, wherein the instructions are further executable by the one or more processors to cause the apparatus to:
determine that the UE did not receive the message in the first transmission opportunity, wherein the instructions executable by the one or more processors to cause the apparatus to transmit the message in the second transmission opportunity are executable by the one or more processors to cause the apparatus to re-transmit the message in the second transmission opportunity based at least in part on the determining.

13. The apparatus of claim 12, wherein the instructions are further executable by the one or more processors to cause the apparatus to:
receive, from the UE, a notification message indicating that the UE did not monitor the first transmission opportunity, wherein the instructions executable by the one or more processors to cause the apparatus to determine that the UE did not receive the message in the first transmission opportunity are further executable by the one or more processors to cause the apparatus to determine that the UE did not receive the message in the first transmission opportunity based at least in part on the notification message.

14. The apparatus of claim 9, wherein the instructions are further executable by the one or more processors to cause the apparatus to:
perform slot aggregation, wherein the instructions executable by the one or more processors to cause the apparatus to transmit the message in the first transmission opportunity and to transmit the message in the second transmission opportunity are further executable by the one or more processors to cause the apparatus to transmit the message in the first transmission opportunity and to transmit the message in the second transmission opportunity based at least in part on the slot aggregation.

15. An apparatus for wireless communications at a first network device, comprising:
means for transmitting a configuration message or a dual active link handover command to a user equipment (UE) indicating a configuration associated with the UE performing a dual active link handover, wherein the configuration indicates a temporal relationship between a first transmission opportunity and a second transmission opportunity subsequent to the first transmission opportunity, the temporal relationship comprising a re-transmission timer;
means for identifying that the UE is performing the dual active link handover, wherein the UE concurrently maintains a first communication link with the first network device and a second communication link with a second network device while performing the dual active link handover;
means for transmitting a message to the UE in the first transmission opportunity, wherein the first network device activates the re-transmission timer after transmitting the message; and
means for transmitting, based at least in part on an expiration of the re-transmission timer, the message to the UE in the second transmission opportunity subsequent to the first transmission opportunity based at least in part on the UE performing the dual active link handover and based at least in part on the temporal relationship between the first transmission opportunity and the second transmission opportunity indicated by the configuration.

16. The apparatus of claim 15, wherein the re-transmission timer for re-transmission of the message missed during the first transmission opportunity is shorter than a default re-transmission timer.

17. The apparatus of claim 15, further comprising:

means for configuring the UE with a slot aggregation configuration associated with the UE performing the dual active link handover, wherein the means for transmitting the message in the first transmission opportunity and in the second transmission opportunity are based at least in part on the slot aggregation configuration.

18. The apparatus of claim 17, wherein the configuration message or the dual active link handover command indicates the slot aggregation configuration, wherein the slot aggregation configuration comprises one or both of a number of repetitions of the message in a plurality of slots and a periodicity for repetitions of the message in the plurality of slots.

19. The apparatus of claim 15, further comprising:

means for determining that the UE did not receive the message in the first transmission opportunity, wherein the means for transmitting the message in the second transmission opportunity comprises means for re-transmitting the message in the second transmission opportunity based at least in part on the determining.

20. The apparatus of claim 19, further comprising:

means for receiving, from the UE, a notification message indicating that the UE did not monitor the first transmission opportunity, wherein the determining is based at least in part on the notification message.

21. The apparatus of claim 15, further comprising:

means for performing slot aggregation, wherein the message is transmitted in the first transmission opportunity and the second transmission opportunity based at least in part on the slot aggregation.

22. The apparatus of claim 15, wherein the first network device comprises a source network device of the dual active link handover or a target network device of the dual active link handover.

23. A non-transitory computer-readable medium storing code for wireless communications at a first network device, the code comprising instructions executable by one or more processors to:

transmit a configuration message or a dual active link handover command to a user equipment (UE) indicating a configuration associated with the UE performing a dual active link handover, wherein the configuration indicates a temporal relationship between a first transmission opportunity and a second transmission opportunity subsequent to the first transmission opportunity, the temporal relationship comprising a re-transmission timer;

identify that the UE is performing the dual active link handover, wherein the UE concurrently maintains a first communication link with the first network device and a second communication link with a second network device while performing the dual active link handover;

transmit a message to the UE in the first transmission opportunity, wherein the first network device activates the re-transmission timer after transmitting the message; and transmit, based at least in part on an expiration of the re-transmission timer, the message to the UE in the second transmission opportunity subsequent to the first transmission opportunity based at least in part on the UE performing the dual active link handover and based at least in part on the temporal relationship between the first transmission opportunity and the second transmission opportunity indicated by the configuration.

24. The non-transitory computer-readable medium of claim 23, wherein the re-transmission timer for re-transmission of the message missed during the first transmission opportunity is shorter than a default re-transmission timer.

25. The non-transitory computer-readable medium of claim 23, wherein the instructions are further executable by the one or more processors to:

configure the UE with a slot aggregation configuration associated with the UE performing the dual active link handover, wherein the instructions executable by the one or more processors to transmit the message in the first transmission opportunity and in the second transmission opportunity are based at least in part on the slot aggregation configuration.

26. The non-transitory computer-readable medium of claim 25, wherein the configuration message or the dual active link handover command indicates the slot aggregation configuration, wherein the slot aggregation configuration comprises one or both of a number of repetitions of the message in a plurality of slots and a periodicity for repetitions of the message in the plurality of slots.

27. The non-transitory computer-readable medium of claim 23, wherein the instructions are further executable by the one or more processors to:

determine that the UE did not receive the message in the first transmission opportunity, wherein the instructions executable by the one or more processors to transmit the message in the second transmission opportunity are executable by the one or more processors to re-transmit the message in the second transmission opportunity based at least in part on the determining.

28. The non-transitory computer-readable medium of claim 27, wherein the instructions are further executable by the one or more processors to:

receive, from the UE, a notification message indicating that the UE did not monitor the first transmission opportunity, wherein the determining is based at least in part on the notification message.

29. The non-transitory computer-readable medium of claim 23, wherein the instructions are further executable by the one or more processors to:

perform slot aggregation, wherein the message is transmitted in the first transmission opportunity and the second transmission opportunity based at least in part on the slot aggregation.

30. The non-transitory computer-readable medium of claim 23, wherein the first network device comprises a source network device of the dual active link handover or a target network device of the dual active link handover.

* * * * *